(12) United States Patent
Hanai

(10) Patent No.: US 11,652,856 B2
(45) Date of Patent: May 16, 2023

(54) SERVER SYSTEM AND METHOD OF CONTROLLING SERVER SYSTEM

(71) Applicant: CANON KABUSHIKI KAISHA, Tokyo (JP)

(72) Inventor: Hiroaki Hanai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/408,275

(22) Filed: Aug. 20, 2021

(65) Prior Publication Data
US 2022/0060524 A1    Feb. 24, 2022

(30) Foreign Application Priority Data
Aug. 24, 2020   (JP) .............................. JP2020-141121

(51) Int. Cl.
*H04L 65/402*   (2022.01)
*H04L 65/403*   (2022.01)
*H04L 9/40*   (2022.01)

(52) U.S. Cl.
CPC ........ *H04L 65/4025* (2022.05); *H04L 63/083* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 6,489,980 B1* | 12/2002 | Scott | ..................... | G06F 16/958 |
| | | | | 707/E17.116 |
| 2003/0182375 A1* | 9/2003 | Zhu | ....................... | G06F 40/169 |
| | | | | 709/205 |
| 2011/0264745 A1* | 10/2011 | Ferlitsch | .............. | G06Q 10/109 |
| | | | | 709/204 |
| 2012/0218599 A1 | 8/2012 | Kashioka | | |
| 2012/0324531 A1* | 12/2012 | Bhamidipaty | ...... | H04L 63/1408 |
| | | | | 726/1 |
| 2022/0027110 A1* | 1/2022 | Abe | ....................... | G06F 3/1268 |

FOREIGN PATENT DOCUMENTS

| | | |
|---|---|---|
| EP | 2 453 349 A2 | 5/2012 |
| JP | 2018198069 A | 12/2018 |

\* cited by examiner

*Primary Examiner* — Mohamed Ibrahim
(74) *Attorney, Agent, or Firm* — Cannon U.S.A., Inc. IP Division

(57) ABSTRACT

A server system according to the present application includes an issuing unit configured to issue a meeting identification, a storage unit configured to store the issued meeting ID and a file in association with each other, a first control unit configured to receive an instruction to display the file from a first user and configured to display an operation of the first user on an image of the file for which the display instruction is issued on a display unit of an information processing apparatus operated by a second user, and a second control unit configured to display an icon for printing the file associated with the meeting ID together with the image of the file that is operated by the first user on the display unit of the information processing apparatus operated by the second user.

7 Claims, 23 Drawing Sheets

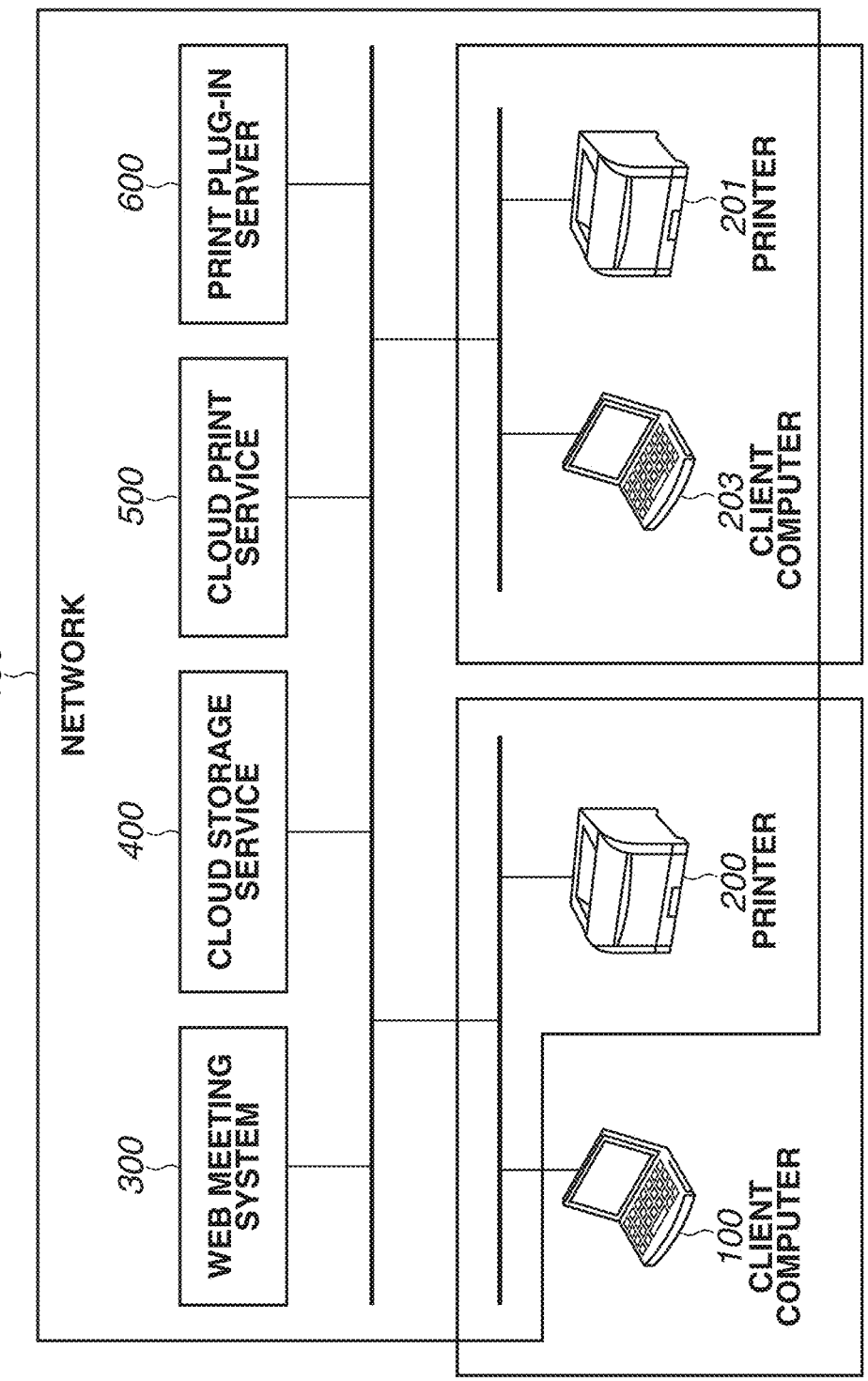

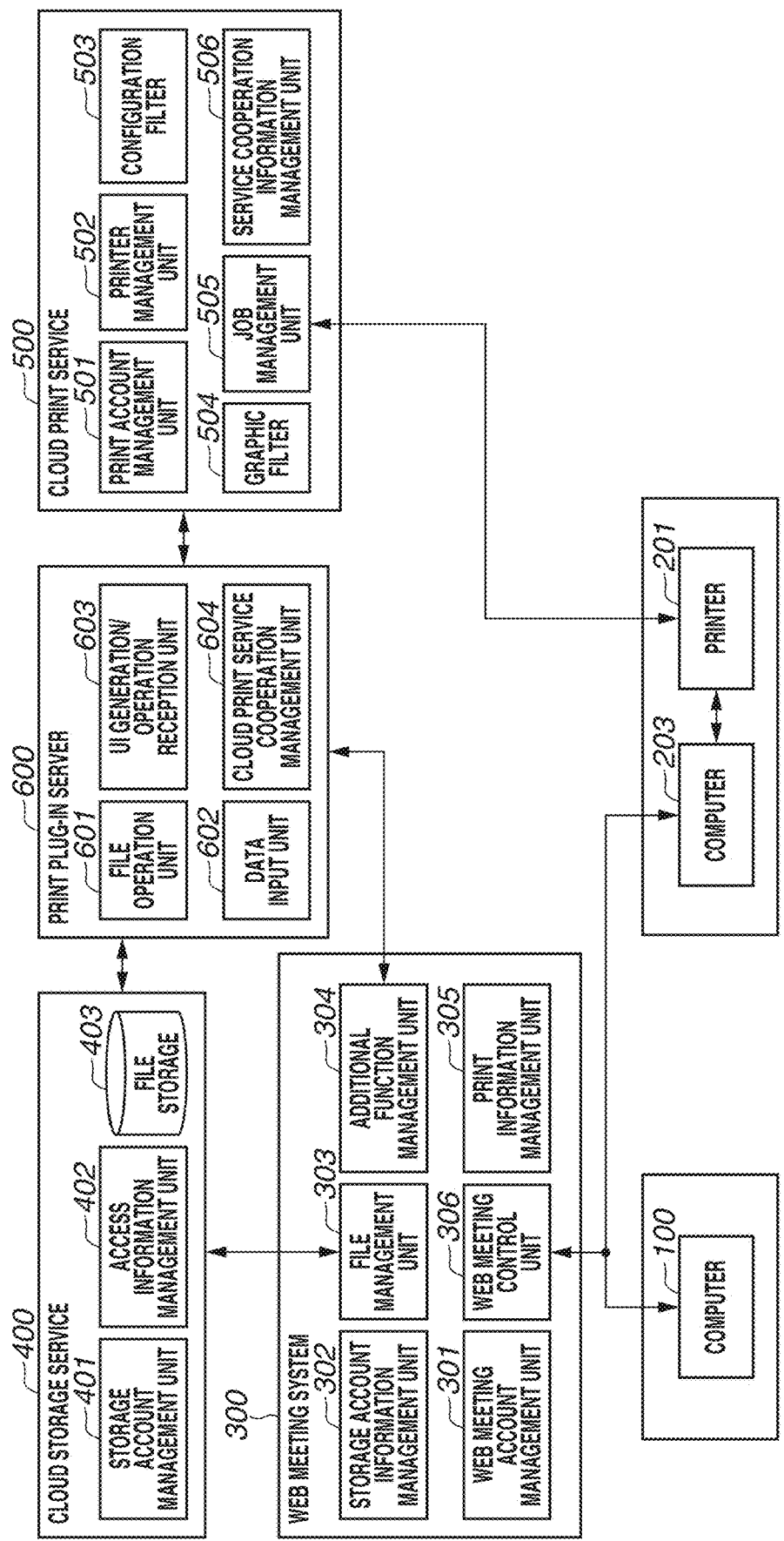

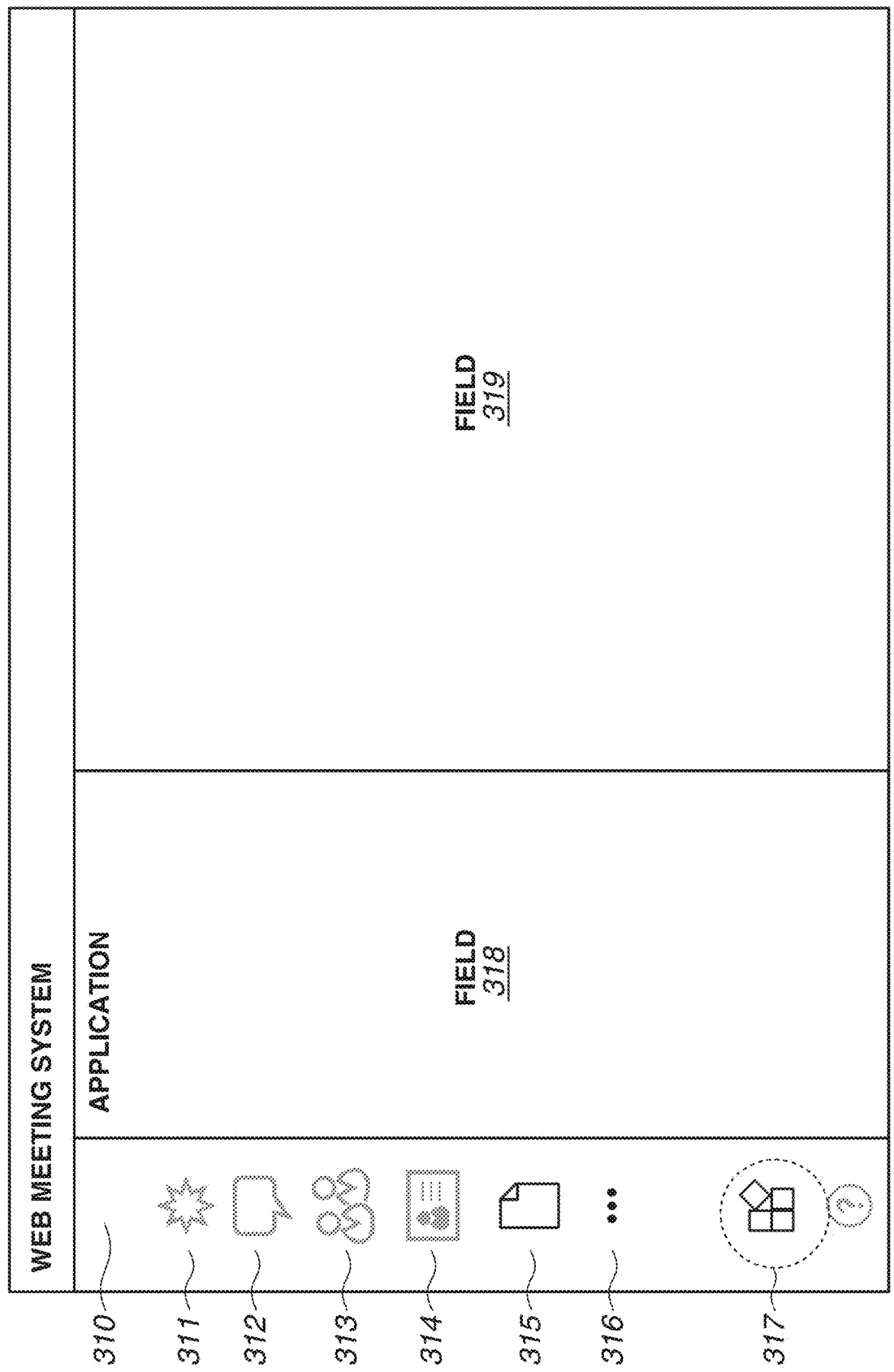

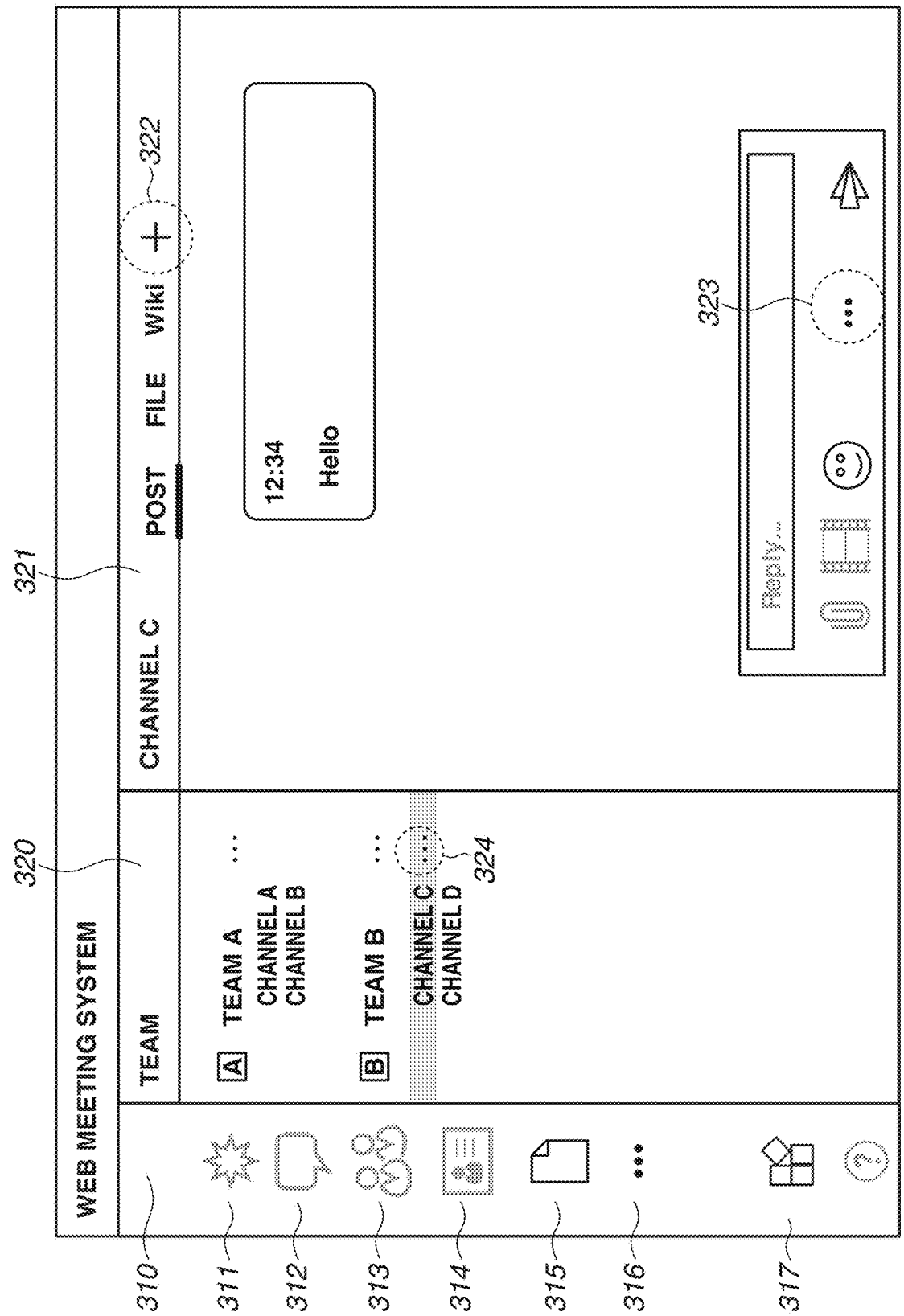

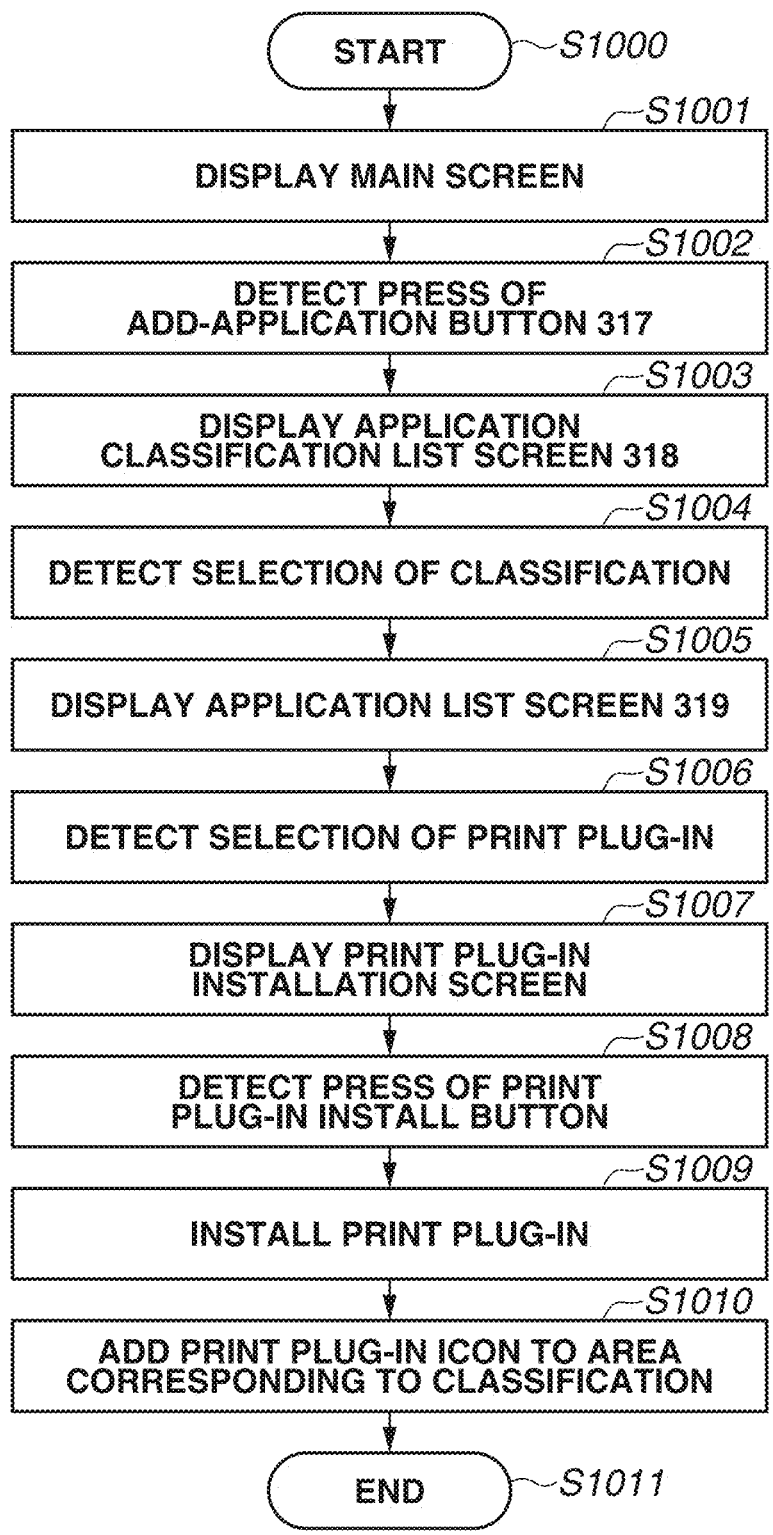

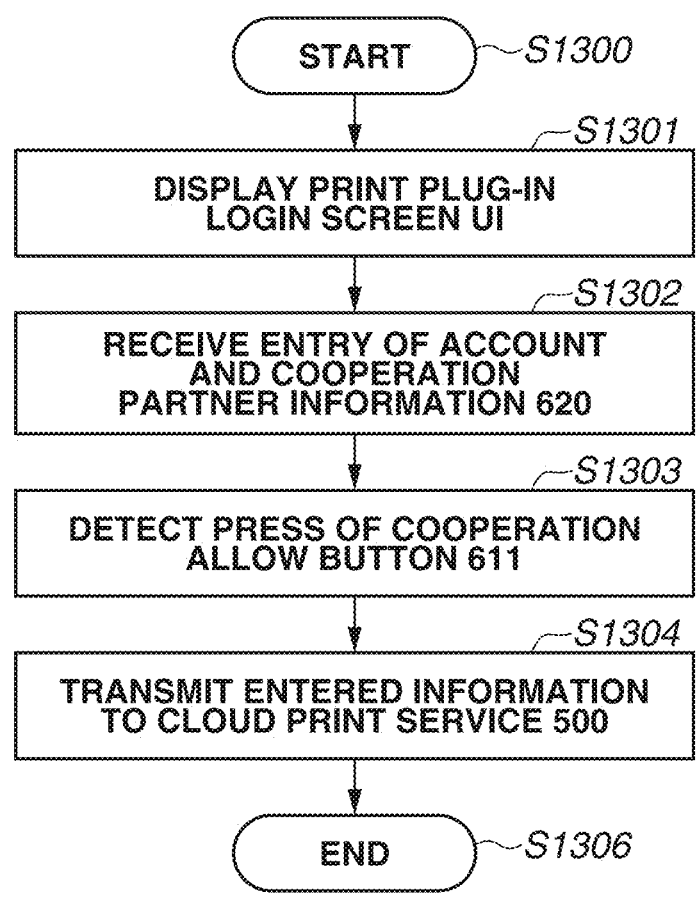

FIG.6

| CATEGORY | ATTRIBUTE | VALUE |
|---|---|---|
| FILE ATTRIBUTE | FILE NAME | Report.pptx |
| | CREATOR | Luis |
| | SIZE | 1.23 Mb |
| | UPDATE DATE/TIME | 2020/01/23 12:34 |
| SHARING SETTING | SHARING | ALL |
| ACCESS RIGHT | READING | ALLOWED |
| | DOWNLOADING | NOT ALLOWED |
| | WRITING | NOT ALLOWED |
| | PRINTING | ALLOWED |

FIG.7A

| PRINTER NAME | PRINTER ID | REGISTERER | PRINTER STATE | NUMBER OF JOBS | SHARING STATE | SHARING NAME | SHARING RANGE |
|---|---|---|---|---|---|---|---|
| PrinterA | xxxxxxxx-yyyy-zzzz-aaaa-bbbbbbbbbbbb | Luis | active | 1 | share | office-printer | TENANT A |
| PrinterB | ... | Luis | sleep | 0 | forbid | home-printer | --- |
| PrinterC | ... | Daniela | active | 2 | forbid | default-printer | --- |
| PrinterD | ... | Daniela | ... | ... | ... | ... | ... |
| PrinterE | ... | Joe | ... | ... | ... | ... | ... |
| PrinterF | ... | Joe | ... | ... | ... | ... | ... |
| PrinterG | ... | Michael | ... | ... | ... | ... | ... |

FIG.7B

| USER NAME | TENANT NAME |
|---|---|
| Luis | TENANT A |
| Daniela | TENANT A |
| Joe | TENANT B |
| Michael | TENANT A, TENANT C |
| ... | ... |

FIG.8A

| PRINT CHECK | FILE NAME | OWNER |
|---|---|---|
| ✓ | | |
| ☐ | | |
| ☐ | | |
| ☐ | | |
| ☐ | | |

PRINTER ▼   DETAILED SETTINGS

PRINT

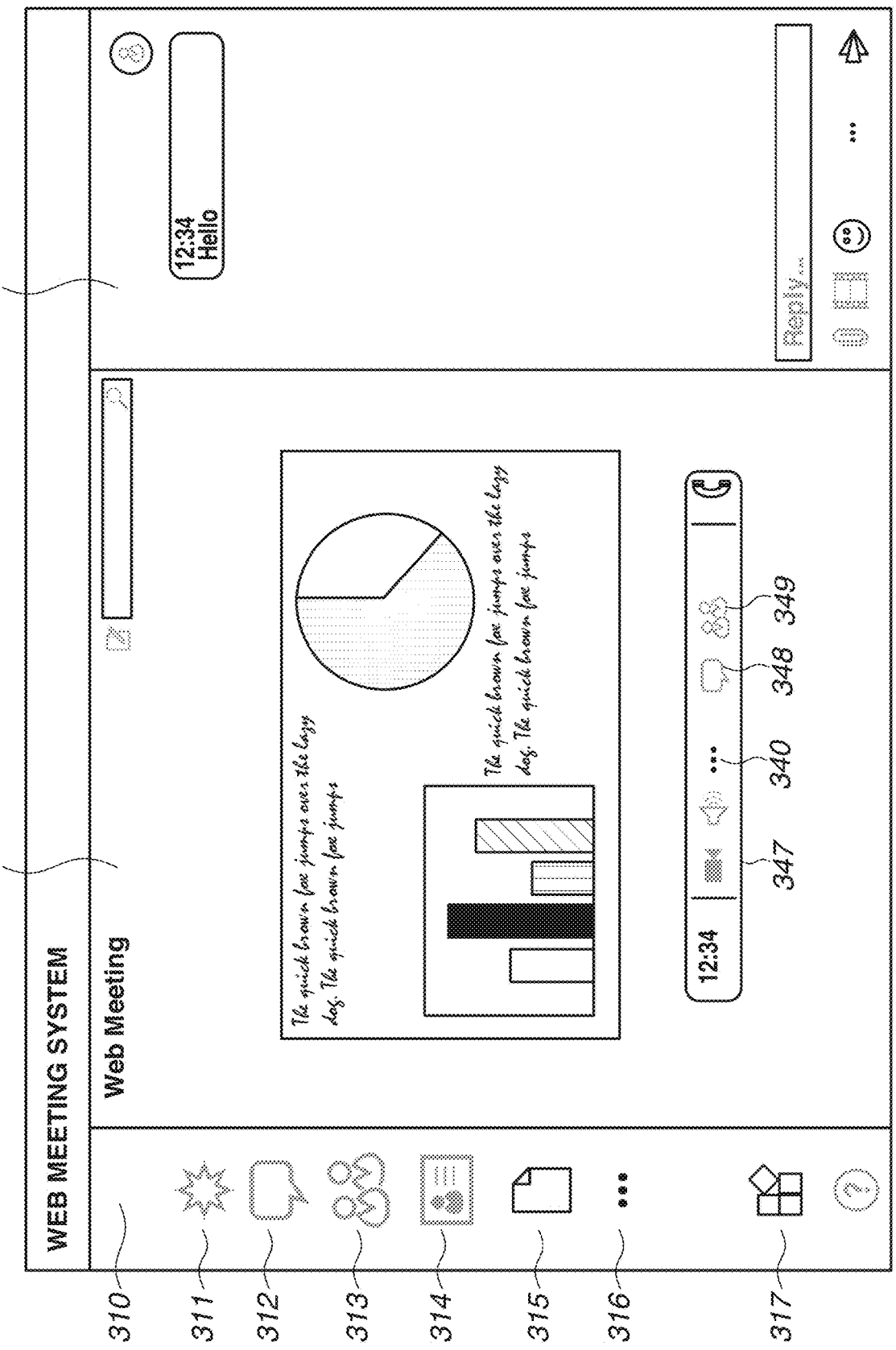

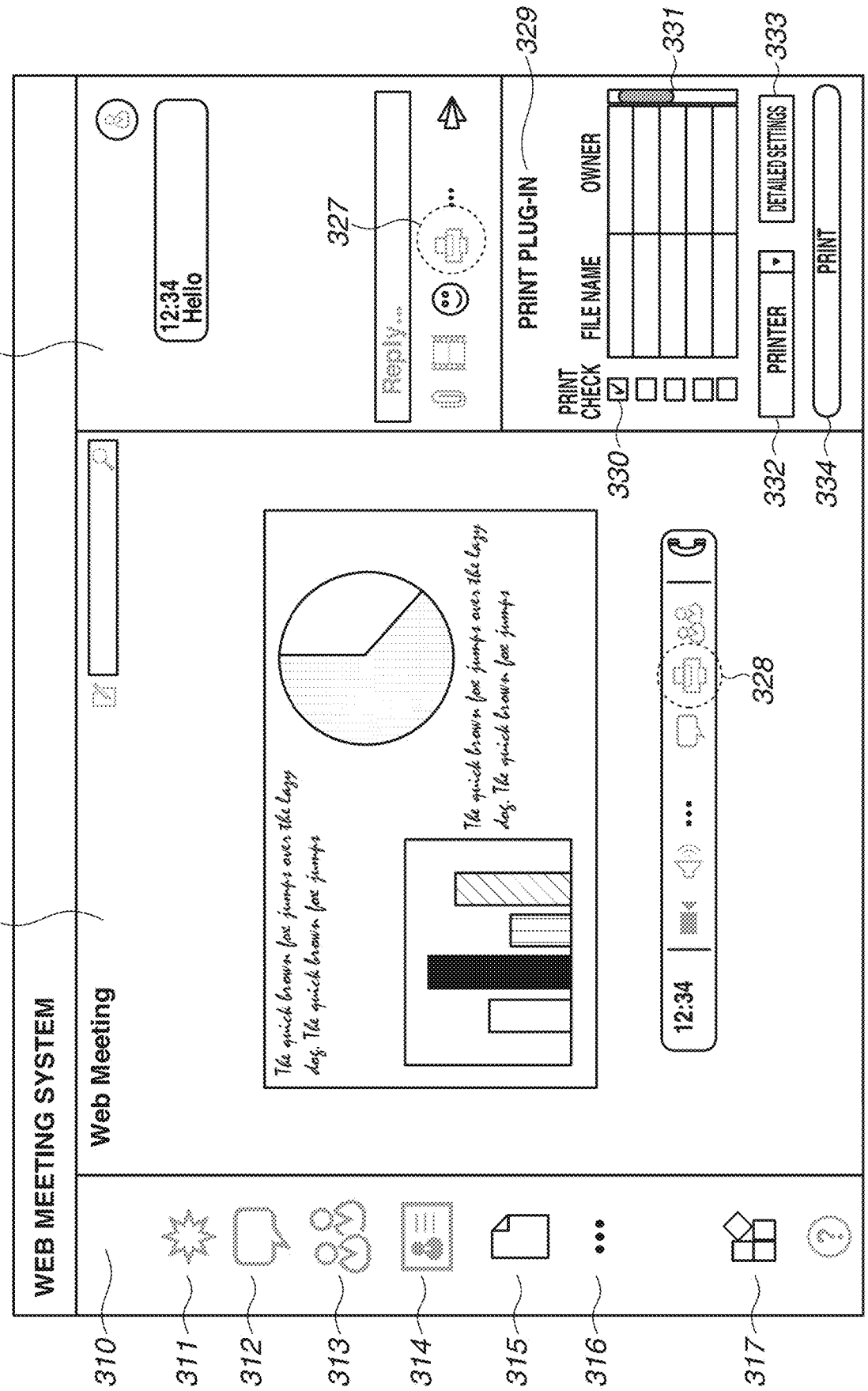

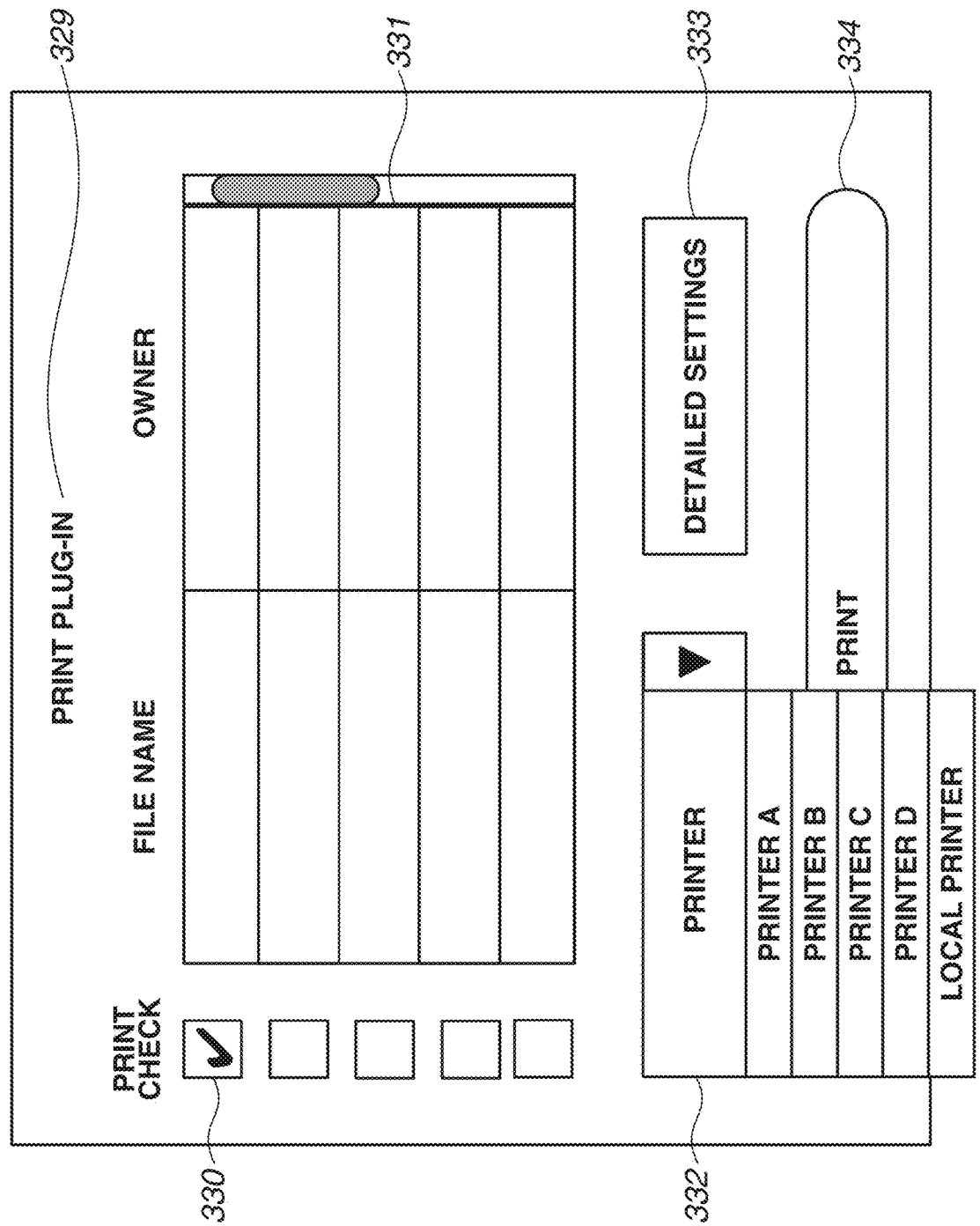

FIG.11

| MEETING ID | MEETING URL | DATE | HOST | MEMBER | FILE INFORMATION | | |
|---|---|---|---|---|---|---|---|
| | | | | | URL | DOWNLOAD | PRINT |
| 1 | http://www.aaa.bbb | 2020/8/4 | user A | user B, user C, user D | http://www.xxx.yyy | 1 | 1 |
| | | | | | http://www.ccc.ddd | 0 | 0 |
| 2 | http://www.aaa.bbb | 2020/8/10 | user B | user X | | | |
| ⋮ | ⋮ | ⋮ | ⋮ | ⋮ | ⋮ | | |

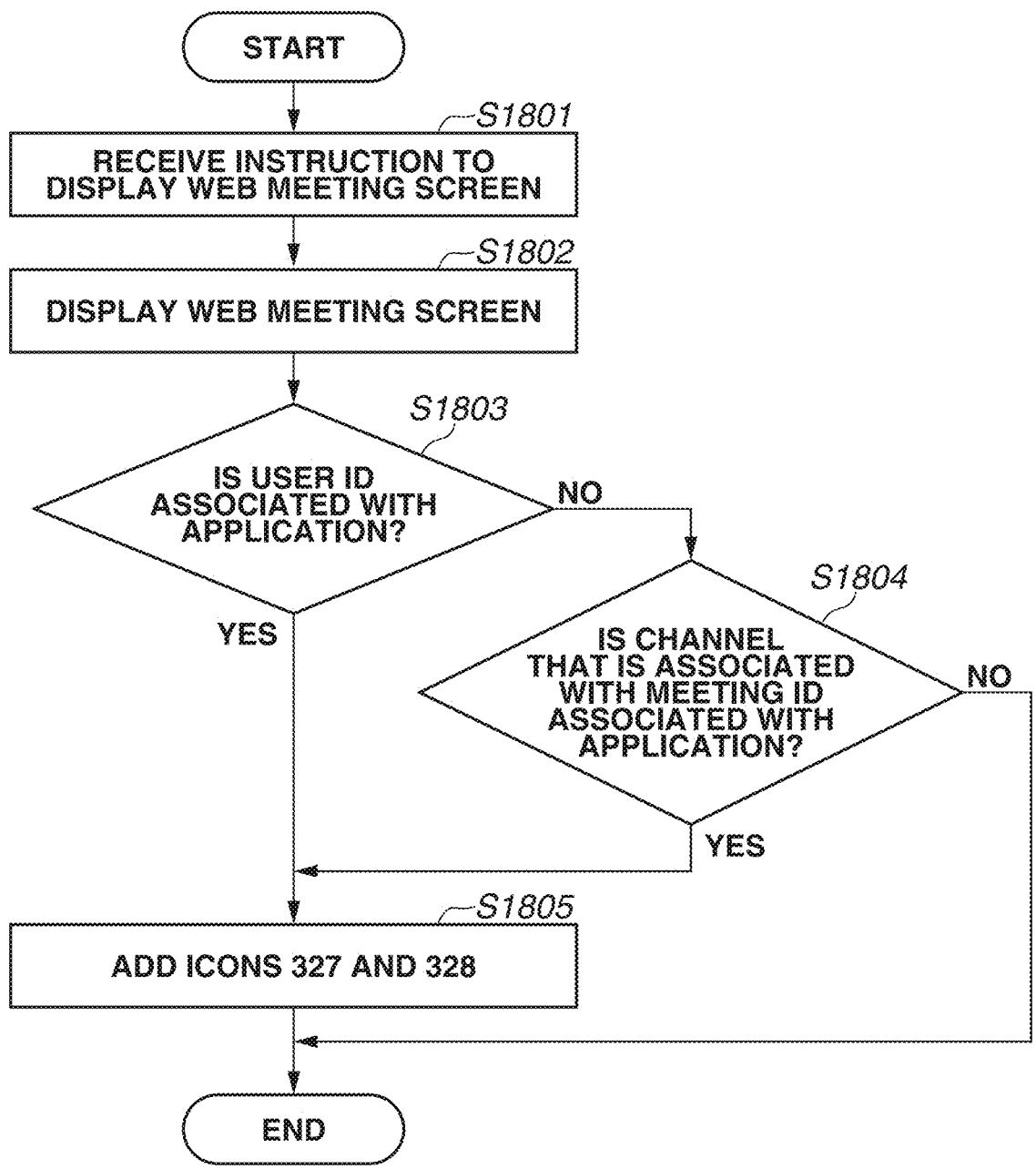

SERVER SYSTEM AND METHOD OF CONTROLLING SERVER SYSTEM

BACKGROUND

Field

The present disclosure relates to a server system and a method of controlling the server system.

Description of the Related Art

A method, in which a presentation screen at a presenting user is shared with a web meeting screen at an audience user and the audience user refers to a file displayed on the screen, is a known method of sharing a file on a web meeting system. In this method, a file that is opened locally or on a shared server by the presenting user is selected from the web meeting system and displayed. Further, in another file sharing method, a file owner uploads a file stored on a shared server or a local file to a system in advance, and the audience user downloads the uploaded file before or after a meeting to check the file. Representative examples of web meeting systems include Microsoft Teams®, Zoom®, and Skype®.

Further, Japanese Patent Application Laid-Open No. 2018-198069 discusses a method in which a member of a meeting uploads a file relating to the meeting to a web meeting system to share the file with other users attending the meeting.

In the web meeting system, a member can refer to a file uploaded by another member and can download the uploaded file. However, printing a shared file requires downloading the file, opening the file using an application different from the web meeting system, and then issuing a print instruction.

SUMMARY

The present application is based on the above-described issue and is directed to a technique for receiving an instruction to print a file shared in a web meeting system on the web meeting system.

According to an aspect of the present disclosure, a server system includes an issuing unit configured to issue a meeting identification, a storage unit configured to store the issued meeting ID and a file in association with each other, a first control unit configured to receive an instruction to display the file from a first user and configured to display an operation of the first user on an image of the file for which the display instruction is issued on a display unit of an information processing apparatus operated by a second user, and a second control unit configured to display an icon for printing the file associated with the meeting ID together with the image of the file that is operated by the first user on the display unit of the information processing apparatus operated by the second user.

Further features of the present disclosure will become apparent from the following description of exemplary embodiments with reference to the attached drawings.

BRIEF DESCRIPTION OF THE DRAWINGS

FIG. 2 is a block diagram illustrating an example of a network configuration according to an exemplary embodiment of the present disclosure.

FIG. 3 is a block diagram illustrating an example of a software block configuration according to an exemplary embodiment of the present disclosure.

FIG. 4A is a diagram illustrating an example of a screen provided by a web meeting system according to an exemplary embodiment of the present disclosure.

FIG. 4B is a diagram illustrating an example of a screen in a case where a channel function of a web meeting system is used according to an exemplary embodiment of the present disclosure.

FIG. 5A is a flowchart illustrating a process of installing a print plug-in through an application button on a web meeting system according to an exemplary embodiment of the present disclosure.

FIG. 5C is a flowchart illustrating a cooperation process between a print plug-in installed in a web meeting system and a cloud print service according to an exemplary embodiment of the present disclosure.

FIG. 6 is a table illustrating an example of file information managed by a cloud storage service according to an exemplary embodiment of the present disclosure.

FIGS. 7A and 7B are tables illustrating an example of printer information managed by a cloud print service according to an exemplary embodiment of the present disclosure.

FIG. 8A is a diagram illustrating an example of a screen provided by a print plug-in according to an exemplary embodiment of the present disclosure.

FIG. 9A is a diagram illustrating an example of a web meeting screen before a print plug-in is installed according to an exemplary embodiment of the present disclosure.

FIG. 9B is a diagram illustrating an example of a web meeting screen after a print plug-in is installed according to an exemplary embodiment of the present disclosure.

FIG. 10A is a diagram illustrating an example of a screen displayed by a print plug-in server according to a third exemplary embodiment.

FIG. 11 is a table illustrating an example of a meeting information stored on a web meeting system according to an exemplary embodiment of the present disclosure.

FIG. 14 is a flowchart illustrating a process that is performed by a web meeting system according to an exemplary embodiment of the present disclosure.

DESCRIPTION OF THE EMBODIMENTS

Various exemplary embodiments of the present disclosure will be described with reference to the drawings.

Figure 1:
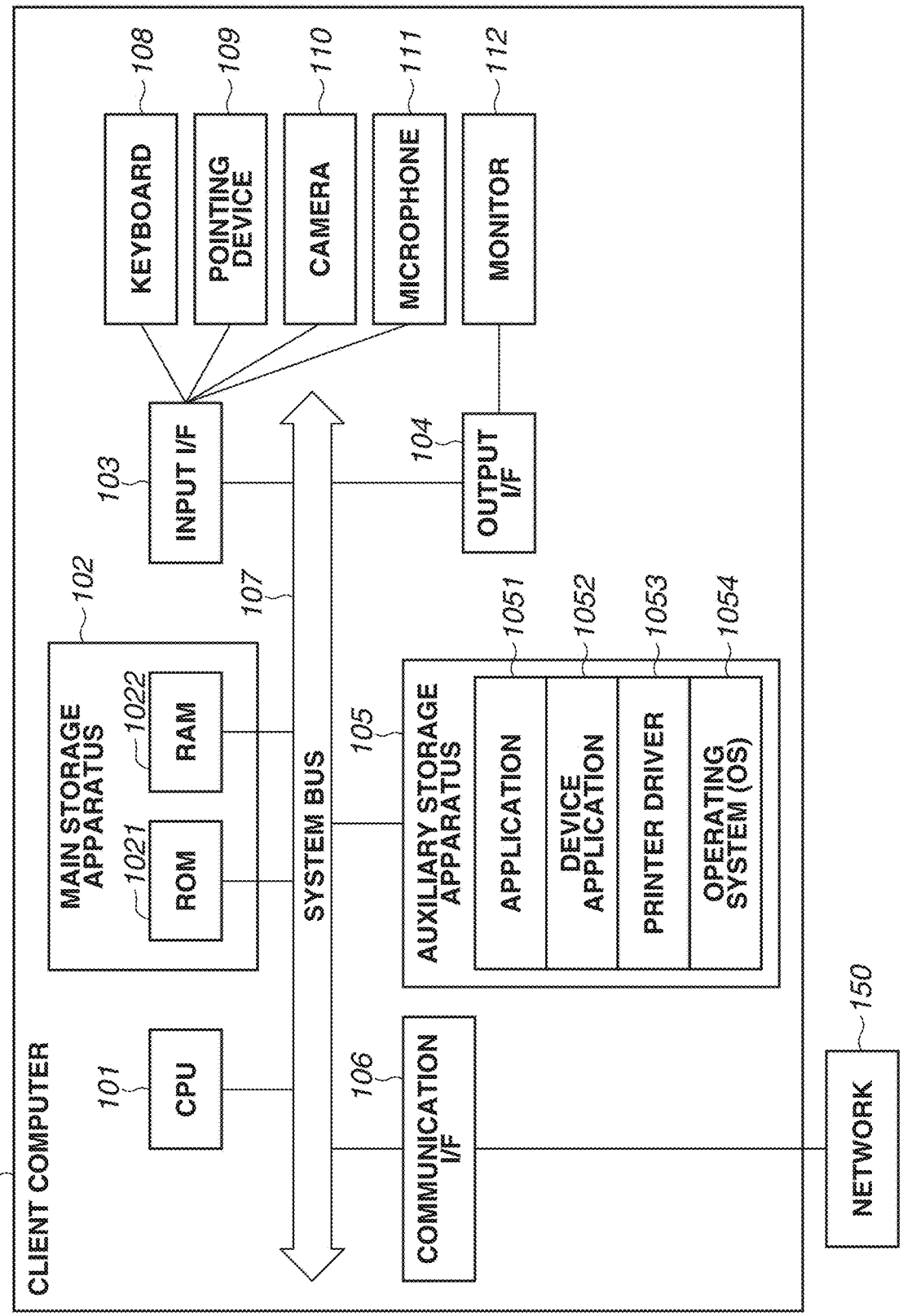
FIG. 1 is a block diagram illustrating an example of a hardware configuration of a client computer according to an exemplary embodiment of the present disclosure.

A first exemplary embodiment will be described. FIG. 1 is a diagram illustrating a hardware configuration of a general computer (information processing apparatus) according to an exemplary embodiment of the present disclosure. Unless otherwise specified, the present disclosure is apparently applicable to a single function system, a system that includes a plurality of devices, and a system that is connected via a network to perform processing, as long as a function of the present disclosure is performed. A client computer 100 includes a system illustrated in FIG. 1. Details thereof will be described.

A central processing unit (CPU) 101 controls the entire apparatus based on a program stored in a read-only memory (ROM) 1021 or a random access memory (RAM) 1022 of a main storage apparatus 102 or in an auxiliary storage apparatus 105.

The RAM 1022 is also used as a work area by the CPU 101 to perform various types of processing. The auxiliary storage apparatus 105 stores an operation system (OS) 1054, an application 1051, a device application 1052, and a printer driver 1053. Hereinafter, the main storage apparatus 102 and the auxiliary storage apparatus 105 will collectively be referred to as a storage apparatus.

Input devices such as a keyboard 108 and a pointing device 109, e.g., a mouse or a touch panel, are devices that are connected via an input interface (input I/F) 103 and are used by a user to issue various instructions to the client computer 100. Further, input devices such as a camera 110 and a microphone 111 are connected also via the input I/F 103. As to the camera 110 and the microphone 111, the client computer 100 may include an image capturing function and a sound collecting function.

An output interface (output I/F) 104 is an interface for outputting data, and outputs data to an output device such as a monitor 112.

Communications with external systems are established through a communication interface (communication I/F) 106 via a network 150. Further, data is exchanged between the I/Fs and the modules via a system bus 107, which is a shared data system bus. Furthermore, the CPU 101 performs processing based on the program stored in the storage apparatus to thereby implement the processing of the present disclosure.

FIG. 2 is a network configuration diagram illustrating a simplified environment of the network 150 according to an exemplary embodiment of the present disclosure. The client computer A 100 and a printer 200 are connected to the network 150 (on the same intranet) and can communicate with each other. Further, a client computer B 203 and a printer 201, which are connected to another intranet, are connected via the Internet. A web meeting system 300, a cloud storage service 400, a cloud print service 500, and a print plug-in server 600 are connected to the network 150.

The web meeting system 300 is a server system including one or more information processing apparatuses. The web meeting system 300 provides an application that runs on the client computer A 100. The web meeting system 300 can be accessed from the client computer 100 and can operate on a web browser to thereby provide an online meeting service. The web meeting system 300 manages an account using a user identification (user ID) and a password for the web meeting system 300. A user accesses the web meeting system 300 and enters the user ID and the password. The web meeting system 300 authenticates the user, so that the user can use the web meeting system 300 using the account. The web meeting system 300 provides an online meeting function using a video call and a chat. A user without an account registration with the web meeting system 300 can use a web meeting service by receiving an invitation to a meeting from a user with an account registration.

The cloud storage service 400 is a server system including one or more information processing apparatuses. The cloud storage service 400 is a storage service configured on the server system. The cloud storage service 400 can be connected to each intranet and can be accessed from the client computers A 100 and 203 via the Internet. The cloud storage service 400 manages accounts. A user accesses the cloud storage service 400, enters an ID and a password for the cloud storage service 400, and transmits a login request to the cloud storage service 400 to log into the cloud storage service 400.

The user can upload file data to the cloud storage service 400 and can download file data from the cloud storage service 400. Further, the uploaded file on the cloud storage service 400 can be shared with another user. The user can set viewing, edition, and download restrictions on the uploaded file. The viewing, edition, and download restrictions can be set for each user or for each group of a plurality of users.

The cloud print service 500 is a print system including one or more information processing apparatuses. In the present exemplary embodiment, the cloud print service 500 can connect to the client computer A 100, the printer 200, the client computer 203, and the printer 201 via the Internet. The cloud print service 500 manages an account using a user ID and a password for the cloud print service 500. The user accesses the cloud print service 500, enters the user ID and the password, and transmits an authentication request to the cloud print service 500, so that user authentication processing is performed. After the user authentication processing is completed, the user can use the cloud print service 500 using the account.

The print plug-in server 600 is a server system including one or more information processing apparatuses. The print plug-in server 600 can cooperate with the cloud print service 500 and provide a print function to the web meeting system 300. The user installs a print plug-in into the web meeting system 300 to use the print plug-in server 600. As a result of installing the print plug-in into the web meeting system 300, a print user interface (print UI) for printing is added to a user interface (UI) of the web meeting system 300. The user operates the added print UI to transmit a processing instruction to the print plug-in server 600, and the print plug-in server 600 having received the instruction performs print processing through the cloud print service 500.

In the present exemplary embodiment, a single sign-on technique is used to access the web meeting system 300, the cloud storage service 400, and the cloud print service 500. This enables access to each service using the account for the web meeting system 300.

FIG. 3 is a software configuration diagram illustrating components of a system according to an exemplary embodiment of the present disclosure. Each software block is implemented by a CPU of an information processing apparatus of each service, server, or apparatus executing a program stored in a memory.

The web meeting system 300 is a service that includes a business chart function and a video call function through the Internet, and various functions can be added to the web meeting system 300. In the present exemplary embodiment, the web meeting system 300 includes functions of a web meeting account management unit 301, a storage account information management unit 302, a file management unit 303, an additional function management unit 304, a print information management unit 305, and a web meeting control unit 306.

The web meeting account management unit 301 manages user information (ID, password, and other settings) registered in the web meeting system 300 by the user. The web meeting account management unit 301 performs authentication processing using information entered by the user to log into the web meeting system 300. Further, in a case where a setting is changed by the user, the web meeting account management unit 301 updates internal information.

The storage account information management unit 302 manages account information for use to access the cloud storage service 400 from the web meeting system 300. The storage account information management unit 302 stores the account information of the web meeting system 300 in association with a token for access to the cloud storage service 400.

The file management unit 303 manages access information about the cloud storage service 400 or access information about the files in the cloud storage service 400 and changes and manages the access information for each user or group. Further, the file management unit 303 also manages access information to a file storage of the web meeting system 300.

The additional function management unit 304 displays an application that can be installed into the web meeting system 300, receives installation, and manages the installed application. The additional function management unit 304 adds an item of the installed application on the web meeting system 300 and calls a function. The additional function management unit 304 stores a manifest file about an additional function that can be used in the web meeting system 300. In a case where the user selects a function to be used, information for access to the manifest file is stored in association with the user.

The print information management unit 305 manages access information (such as a universal resource locator (URL) of a connection destination) of the cloud print service 500 to which the print plug-in server 600 is connected, the users registered in the cloud print service 500, and printer queue information. Further, the print information management unit 305 manages user information (ID and password) used in connecting to the cloud print service 500. While the web meeting system 300 includes the print information management unit 305 in the present exemplary embodiment, similar information can be stored in the print plug-in server 600.

The web meeting control unit 306 performs a chat, shares a screen, and changes an interface during a web meeting. Further, the web meeting control unit 306 issues a meeting ID for identifying the web meeting and a URL for attending the web meeting based on a meeting schedule setting from the logged-in user or a meeting start instruction.

The cloud storage service 400 is a file storage/sharing service prepared on the cloud. In the present exemplary embodiment, the cloud storage service 400 includes functions of a storage account management unit 401, an access information management unit 402, and a file storage 403.

The storage account management unit 401 manages user information (ID, password, and setting information such as settings of rights) registered in the cloud storage service 400. The user information is used in checking the consistency of information entered to log into the cloud storage service 400, and in a case where a setting is changed by the user, the storage account management unit 401 updates internal information.

The access information management unit 402 can set an access right of another user or service to the cloud storage service 400. Further, the access information management unit 402 sets an access right of a user to a file stored in the file storage 403 and issues a shared URL. The information managed by the access information management unit 402 will be described with reference to FIG. 6.

The file storage 403 stores files uploaded to the cloud storage service 400 by the user.

The cloud print service 500 is a service located on the cloud via the Internet and provides a print-related function. In the present exemplary embodiment, the cloud print service 500 includes functions of a print account management unit 501, a printer management unit 502, a configuration filter 503, a graphic filter 504, and a job management unit 505. Further, the functions can be on another cloud print service that cooperates with the cloud print service 500.

The print account management unit 501 manages user information about each user registered in the cloud print service 500 (ID, password, group/tenant information about a group or tenant to which the user belongs, information about rights). The user information is used in checking the consistency of information entered by the user to log into the cloud print service 500, and in a case where a setting is changed by the user, internal information is updated. Further, the group/tenant information is used by the print plug-in server 600 in acquiring the printer queue information.

The printer management unit 502 generates a printer queue and registers the generated printer queue in a case where a printer registration instruction is received from a virtual device application installed in a device or a client terminal that supports the cloud print service 500. The registered printer queue is associated with printer identification information, and an attribute such as a printer location is added to the registered printer queue and managed.

Further, a printer information list is generated based on the user information and other information in the printer queue registered in the group or tenant to which the user belongs.

The configuration filter 503 generates a print job based on detailed-setting data received by the cloud print service 500. Further, the graphic filter 504 converts the print job into an appropriate format.

The job management unit 505 manages a print job received from the print plug-in server 600. The received job is once stored in a virtual printer queue (storage field), and the job management unit 505 copies the job to the corresponding printer queue based on output destination information received from the print plug-in server 600 and transmits the print job to the corresponding printer. Alternatively, the job management unit 505 converts a standby print job in the virtual printer queue (storage field) into an appropriate format using the configuration filter 503 or the graphic filter 504, copies the resulting print job to the corresponding printer queue, and transmits the print job. Further, the job management unit 505 also manages the used print target data, detailed-setting data, and bibliographic information (file name and print time/date).

A service cooperation information management unit 506 manages information about another cloud print service that cooperates with the cloud print service 500.

The cloud print service 500 stores pre-registered user information and printer information. FIG. 7A illustrates an example of the printer information registered in the cloud print service 500. Job acceptance capability information and operation status information besides printer name data, printer ID data, registrant data, and state data are registered and managed as the printer information. The registered information can be changed by accessing a webpage of the cloud print service 500, or the information can be changed or acquired using a web application programming interface (web API). Further, the cloud print service 500 includes a table that associates each user with a tenant to which the user belongs as illustrated in FIG. 7B. For example, Printer A is a printer that Luis having logged into the cloud print service 500 has registered, and that can be used by the users belonging to Tenant A. More specifically, Daniela and Michael belonging to Tenant A can access the cloud print service 500 and can transmit a print job to Printer A. On the other hand, Joe not belonging to Tenant A cannot transmit a print job for Printer A to the cloud print service 500 even if Joe logs into the cloud print service 500. Further, Printer B is also printer information that Luis having accessed the cloud print service 500 has registered. Since Printer B is shared with no tenants, the users other than Luis cannot transmit a print job for Printer B to the cloud print service 500.

The print plug-in server 600 provides a print function to the web meeting system 300 to enable printing via the cloud print service 500. In the present exemplary embodiment, the print plug-in server 600 includes functions of a file operation unit 601, a data input unit 602, a UI generation/operation reception unit 603, and a cloud print service cooperation management unit 604.

The file operation unit 601 acquires, from the cloud storage service 400 or the web meeting system 300, a target file for which a print instruction is issued from the print UI displayed on the web meeting system 300.

The data input unit 602 transmits all the detailed-setting data information and the user information received via the print UI, the printer queue information, and the file acquired from the cloud storage service 400 to the cloud print service 500.

The UI generation/operation reception unit 603 displays the print UI on the web meeting system 300. The UI generation/operation reception unit 603 displays a UI for the printer queue and file information (file name and owner) acquired from the cloud print service 500 and receives detailed settings set by the user, the printer queue, and a file selection. Further, the UI generation/operation reception unit 603 displays a UI for cooperating with the cloud print service 500 and receives cooperation information including the user information (ID and password).

The cloud print service cooperation management unit 604 transmits the cooperation information to the cloud print service 500 to cooperate with the cloud print service 500, and transmits the cooperation information, the user information registered in the cloud print service 500, and the printer queue information to the print information management unit 305.

Hereinafter, details of the present exemplary embodiment will be described. First, an operation for starting a web meeting will be described with reference to FIG. 4A. The user accesses the web meeting system 300 using a web meeting application or a web browser installed in the client computer A 100. The user enters the user ID and the password to transmit an authentication request to the web meeting system 300. In a case where the user is successfully authenticated by the web meeting system 300, a screen illustrated in FIG. 4A is displayed. A menu bar 310 displays menu items of the web meeting system 300. An icon 311 is an icon for displaying new information. At the selection of the icon 311, a field 319 displays unread messages transmitted to the user and meeting information about a meeting that the user is to attend. An icon 312 is an icon for displaying a chat screen. At the selection of the icon 312 by the user, a screen for selecting a chat partner from among the users or teams displayed in a field 318 is displayed. The user selects a chat partner and chats with the selected partner using the field 319.

An icon 314 is an icon for displaying a timetable. At the selection of the icon 314 by the user, the field 319 displays a timetable of the user and the other users belonging to the same team as the user. The user selects the time of the meeting from the timetable of the user to attend the meeting, enters details of the meeting, and sets the schedule. In response to the setting of the meeting schedule by the user, a meeting ID is issued. The web meeting system 300 stores the issued meeting ID in association with the user ID of the user having set the meeting schedule and the user ID of each participating member. After the user schedules the meeting, an invitation email for the meeting is transmitted to each user set as a meeting participating member. The invitation email for the meeting contains a URL for attending the meeting, the meeting ID, and the meeting date and time. Each user set as a participating member accesses the URL specified in the invitation email to attend the web meeting. The invitation for the meeting can be issued using a chat or a post tag of the channel.

Further, a user to be a host of the meeting and a user to be a participating member of the meeting can upload a file for use in the meeting to the web meeting system 300 in advance. A user selects a web meeting schedule in which the user is to use the file from the timetable. Consequently, a screen that displays details of the meeting is displayed. The screen displays the meeting date and time, the URL, the participating members, and an upload button for uploading a file. The user selects the upload button and then selects the file to be uploaded. Then, the user sets rights of the other users to the file. The rights include a right to download and a right to print. The value "download" is a value indicating whether to allow the user attending the web meeting to download the file. The value "print" is a value indicating whether to allow the user attending the web meeting to print the file. The rights are set and the file is uploaded, so that the meeting ID of the web meeting and the file are registered in association with each other in the web meeting system 300.

A file registered in the cloud storage service 400 can be used as a file for use in the meeting. In a case where a file registered in the cloud storage service 400 is to be used, the meeting ID of the web meeting and the URL of the file are associated with each other.

FIG. 11 is a meeting information table stored in the web meeting system 300. A meeting ID serving as meeting identification information, a meeting URL required for attending the web meeting, meeting date and time information, host information about the host having registered the meeting schedule, and meeting participating member information are registered in the meeting information table. Further, in a case where the host or a user as a participating member registers a file for use in the meeting, a URL for accessing the file, a right to download the file, and a right to print the file are registered as file information about the file. The registered URL is a URL for access to the file uploaded to the web meeting system 300 or a URL for access to the file that is selected as a file for use in the meeting and is stored in the cloud storage service 400. The right to download is specified by 1 or 0. The value "1" is a value indicating that the user attending the meeting is allowed to download the file. The value "0" is a value indicating that the user attending the meeting is not allowed to download the file. The value "print" is a value indicating whether printing of the file for use in the meeting using the print plug-in server 600 is allowed. The value "1" indicates that printing using the print plug-in server 600 is allowed. The value "0" indicates that printing using the print plug-in server 600 is not allowed.

Additional descriptions of a case where a file stored in the cloud storage service 400 is registered as a file for use in a meeting will be given.

FIG. 6 is file information stored in the file storage 403 of the cloud storage service 400. The file information stores a file name, a creator, a data size, and an update date/time as file attributes. Further, a sharing range of the file is set. Examples of options of the sharing range include "only the creator", "only the team to which the creator belongs, "only the designated team", and "all members allowed to access the file". The access right specifies an operation that the user sharing the file is allowed to perform. The attribute "reading" indicates whether reading of the file is allowed. The attribute "downloading" indicates whether downloading of the file is allowed. The attribute "writing" indicates whether writing to the file on the cloud storage service 400 is allowed. The attribute "printing" indicates whether printing of the file is allowed. In a case where a file stored in the cloud storage service 400 is to be used in a web meeting, whether downloading is allowed and whether printing is allowed can be set based on the access rights set at the cloud storage service 400.

A procedure from the setting of a web meeting schedule to the uploading of a document for use in the web meeting by the user is described above.

Next, a method of printing a document uploaded for use in a web meeting using the print plug-in server 600 will be described.

Figure 5B:
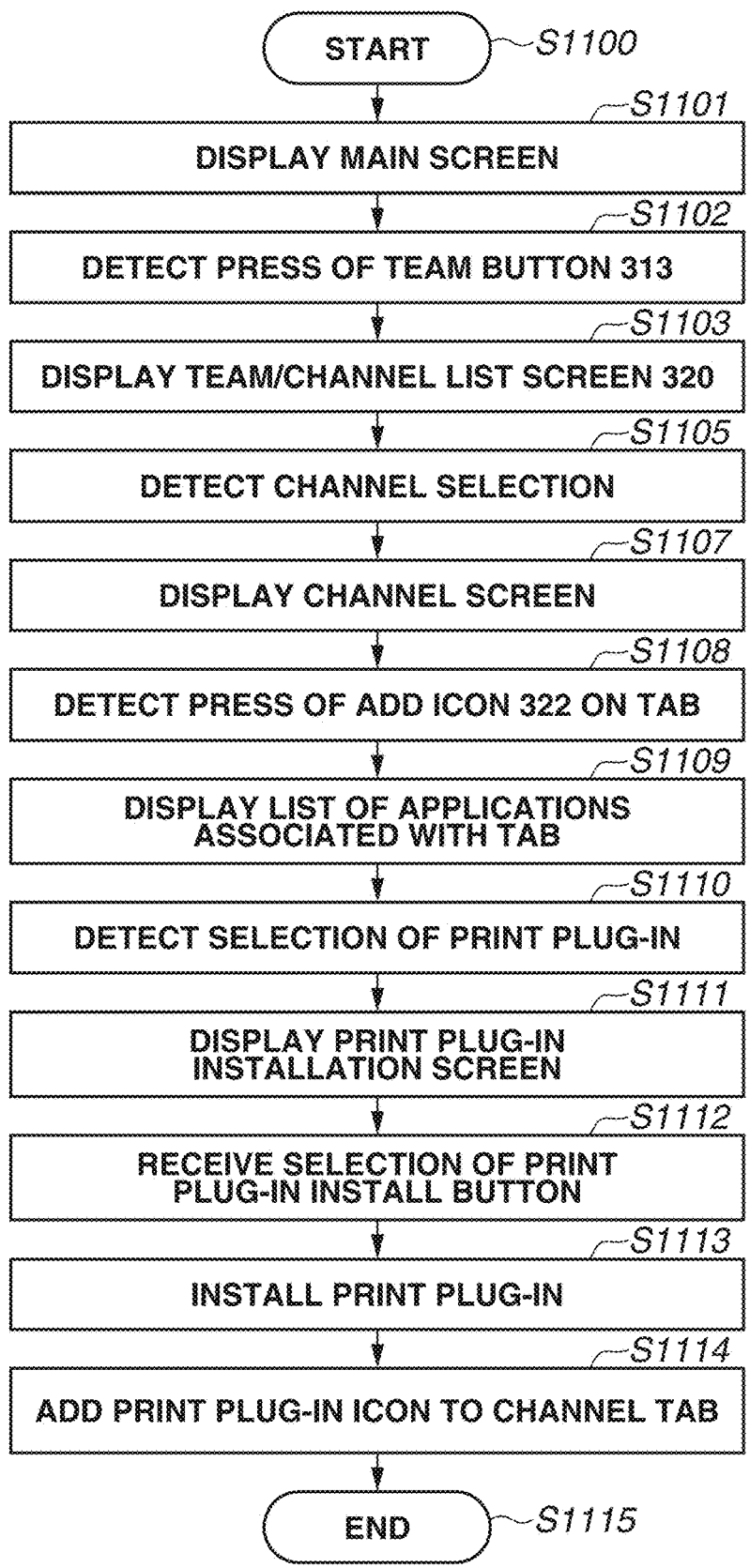
FIG. 5B is a flowchart illustrating a process of installing a print plug-in through a chat or a tab of a channel of a web meeting system according to an exemplary embodiment of the present disclosure.

To use the print plug-in server 600, the user needs to install a plug-in provided by the print plug-in server 600 on the web meeting system 300. The operation of installing the print plug-in will be described with reference to FIGS. 5A and 5B.

FIG. 5A illustrates a process of logging into the web meeting system 300 and installing the print plug-in by the user. A CPU of an information processing apparatus of the web meeting system 300 performs processing illustrated in FIG. 5A. The process illustrated in FIG. 5A is started at a user login to the web meeting system 300.

In step S1001, the web meeting control unit 306 displays a main screen illustrated in FIG. 4A. In step S1002, the web meeting control unit 306 detects a selection of an icon 317 displayed in the menu bar 310 by the user.

In step S1003, the web meeting control unit 306 displays an application classification list screen in the field 318 of a screen of the web meeting system 300. The classification list screen is a screen that displays a list of classification groups of functions that are registered in the additional function management unit 304 and can be added to the web meeting system 300. The classification groups of functions that can be added include "personal", functions such as "messaging", "bot", "tab", and "connector", "popular", and "latest". In step S1004, the web meeting control unit 306 detects a selection of one classification. In step S1005, the web meeting control unit 306 displays a list of applications of the selected classification in the field 319.

In step S1006, the web meeting control unit 306 detects a selection of a print plug-in from the application list displayed in the field 319. In step S1007, the web meeting control unit 306 displays a dialog that displays a description of the application and an install button or a modal dialog. In step S1008, the web meeting control unit 306 detects a press of the install button. Then, in step S1009, the web meeting control unit 306 performs processing to install the print plug-in. The additional function management unit 304 of the web meeting system 300 stores a manifest file of an additional application that can be used in the web meeting system 300. The manifest file describes icons that the application provides to screens in FIGS. 4A, 4B, and 9A provided by the web meeting system 300. The manifest file also describes information for displaying a UI by the print plug-in. Further, the manifest file describes a URL that is a destination of a notification of a predetermined operation. The notification is transmitted in a case where the predetermined operation is performed on the application on the web meeting system 300. The manifest file also describes content of the notification to the URL. The user installs the additional application on the web meeting system 300, so that the user ID and information for access to the manifest file are associated with each other on the web meeting system 300. This enables use of the additional application when the user is logged in the web meeting system 300.

After the installation is completed, in step S1010, the web meeting control unit 306 displays an additional button at an area where the application functions. In this way, a new application button is added on the menu bar 310 of the web meeting system 300 or in an other-functions button 316. Further, a button is added to a chat entry field, a tab, and/or a messaging field of the web meeting system 300 based on the installed application. In a case of a print plug-in, for example, a button for issuing an instruction to print using the print plug-in, e.g., icons 327 and 328 in FIG. 9B, is added.

A range of users to whom an application registered in the additional function management unit 304 is applicable is set at the time of installation of the application. One of the applicable range "only the user having issued the instruction to install the application" and the applicable range "the team/channel to which the user having issued the instruction to install the application belongs" is set as the applicable range of the application. In a case where the applicable range "the team/channel to which the user having issued the instruction to install the application" is set, the web meeting control unit 306 displays a screen for setting the applicable range of the application after the application is installed. The user selects one of "the user only" and "the channel/team to which the user belongs", and sets the applicable range of the application. In a case where the channel to which the user belongs is selected, a user other than the user having issued the instruction to install the application can use the application in a meeting associated with the channel.

The following method is another method of installing an application from the additional function management unit 304. The other installation method will be described with reference to FIG. 5B. In this method, an application is installed from a screen shared in the team to which the logged-in user belongs.

In step S1102, the web meeting control unit 306 detects a press of an icon 313 in FIG. 4A. In step S1103, the web meeting control unit 306 displays a list of teams to which the logged-in users belong and channels associated with the teams as displayed on a team/channel selection screen 320.

In step S1105, the web meeting control unit 306 receives a selection of a channel. In a case where there is not a channel in which the user wishes to install the print plug-in, the user generates a new channel from the screen illustrated in FIG. 4B.

In step S1107, the web meeting control unit 306 displays a channel screen in the field 319 of the screen. The channel screen displays the information that is associated with the selected channel and includes the content selected from a tab field 321. A "post" button in the tab field 321 is a button for displaying a post of a user attending to the channel A "file" button is a button for displaying a list of files shared in the channel. An icon 322 is an icon for installing an application that all the users belonging to the channel can share and use.

In step S1108, the web meeting control unit 306 detects a selection of the icon 322 on the tab. In step S1109, the web meeting control unit 306 displays a list of applications that are installable in the channel. The displayed applications are the applications that are registered in the additional function management unit 304 and can be used by any users in the channel after the applications are installed. In other words, after a user belonging to the channel installs the application, any user can use the installed application during a web meeting that belongs to the channel.

In step S1110, the web meeting control unit 306 receives a selection of a print plug-in from the list of applications. In step S1111, the web meeting control unit 306 displays an installation screen that includes a description of the print plug-in and an install button. In step S1112, the web meeting control unit 306 receives a selection of the install button. In step S1113, the web meeting control unit 306 performs processing to install the print plug-in. In step S1114, the web meeting control unit 306 adds a print plug-in item to the tab.

There is also a method of installation from a chat, and an application can be installed from a function extension button 323 displayed in an application field of the chat entry field on the chat screen of the channel. In a case where the web meeting system 300 detects a press of the function extension button 323, only the applications associated with the chat are displayed, and steps S1110 to S1113 are performed in this order to install the print plug-in. As described above, the application is installed from the team screen, so that any user belonging to the team can use the application. Further, while the method of installation from the channel screen is described above, an application can be installed from the chat screen opened from the icon 328 in the web meeting system 300.

The print plug-in is installed prior to a web meeting, so that a button for issuing an instruction to print a document is displayed on a web meeting screen.

FIG. 9A illustrates an example of a web meeting screen displayed on a client computer in a state where a print plug-in is not installed. The web meeting screen is displayed in a case where the user accesses an issued meeting URL. A shared screen 325 displays the contents of files shared by users attending the meeting and images captured by cameras of client terminals used by the members. The users attending the web meeting can perform an operation on an image of a file displayed on the shared screen 325. The user operation on the displayed image of the file is shared with the other users attending the web meeting, so that the other users can view the operation being performed. A tool bar 347 displays an icon for distributing or not distributing audio output, an icon for distributing or not distributing a camera image, and an icon for displaying or hiding a chat field 326. For example, in a case where an icon 348 is selected, the chat field 326 is displayed on the screen. In a case where an icon 349 is selected, a member list is displayed on the screen. To display an uploaded document on the shared screen 325, the user selects an icon 340. The user selects a file to be displayed on the shared screen 325 from the list of uploaded documents and the screen displayed on the client terminal of the user, so that the screen displaying the selected file is shared with the members.

FIG. 9B illustrates an example of a web meeting screen after the print plug-in is installed. After the print plug-in is installed, the icons 327 and 328 are added to a tool bar on the shared screen 325 or a function field on the chat field 326. The user can print a file shared in a web meeting by selecting the icon 327 or 328. A process of displaying the icons 327 and 328 by the web meeting system 300 will be described with reference to FIG. 14. Each step in FIG. 14 is executed by a module of the web meeting system 300.

In step S1801, the web meeting control unit 306 receives an instruction to display the web meeting screen. In step S1802, the web meeting control unit 306 displays the web meeting screen illustrated in FIG. 9A. In step S1803, the web meeting control unit 306 determines whether the logged-in user is allowed to use the print plug-in. The web meeting system 300 stores a table in which the user ID of the user is associated with an application that the user is allowed to use. The web meeting control unit 306 refers to the table to determine whether the user is allowed to use the print plug-in.

In a case where the web meeting control unit 306 determines that the user is not allowed to use the print plug-in (NO in step S1803), the processing proceeds to step S1804. In step S1804, the web meeting control unit 306 determines whether the channel associated with the meeting that the user attends is allowed to use the print plug-in. The web meeting system 300 stores the association of the meeting ID and the channel. The web meeting control unit 306 refers to the association and identifies the channel associated with the web meeting that the user attends. Furthermore, the web meeting system 300 stores a table in which the channel is associated with an application that the channel is allowed to use. The web meeting control unit 306 determines whether the identified channel is associated with the print plug-in.

In a case where the user ID is associated with the print plug-in or in a case where the channel associated with the meeting ID is associated with the print plug-in (YES in step S1804), the processing proceeds to step S1805. In step S1805, the web meeting control unit 306 adds the icons 327 and 328 to the web meeting screen and displays the web meeting screen with the added icons 327 and 328. As described above, as a result of installing the print plug-in, the icons 327 and 328 for using the print plug-in server 600 are displayed on the web meeting screen.

A process of instructing the cloud print service 500 to print using the print plug-in installed in the web meeting system 300 will be described. FIG. 5C is a flowchart illustrating a process that is performed by the print plug-in server 600 for cooperation between the print plug-in and the cloud print service 500. The flowchart is performed at a timing when the icon 327 or 328 is selected for the first time after the print plug-in is installed.

Figure 4C:
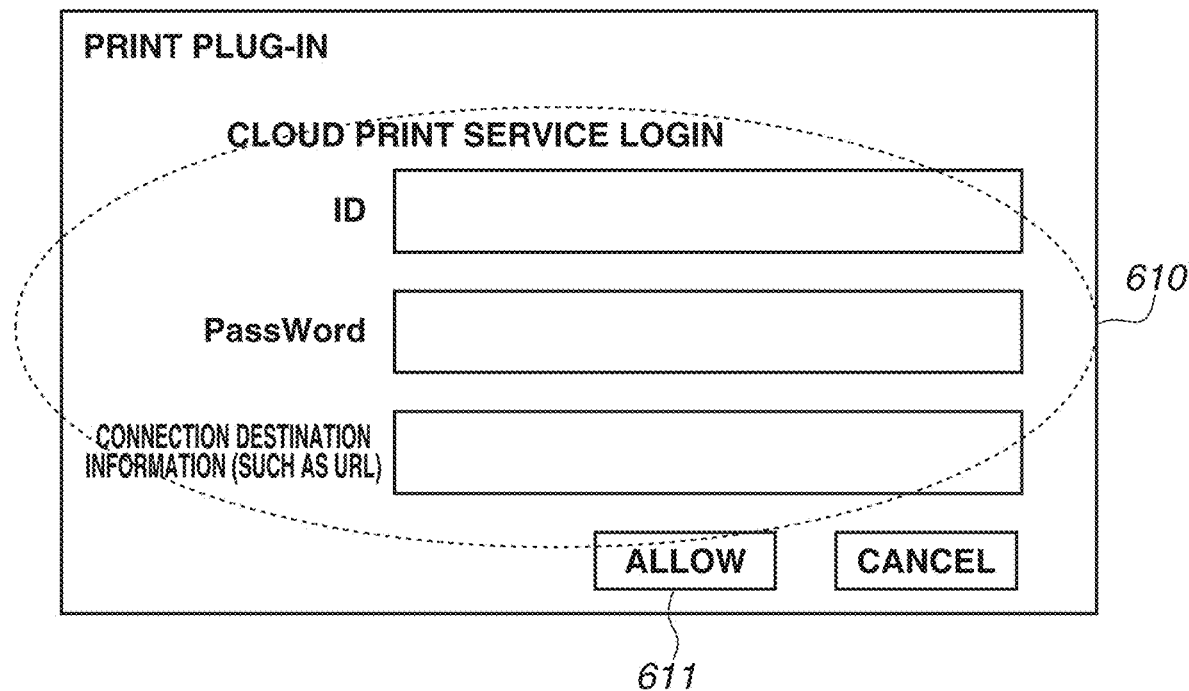
FIG. 4C is a diagram illustrating an example of an authentication screen for logging into a cloud print service according to an exemplary embodiment of the present disclosure.

In step S1301, the additional function management unit 304 displays an authentication screen illustrated in FIG. 4C. In a case where the additional function management unit 304 detects a selection of a print button, the additional function management unit 304 notifies the print plug-in server 600 of the selection. The print plug-in server 600 transmits an authentication request to the cloud print service 500. The cloud print service 500 notifies the print plug-in server 600 of a URL for displaying the authentication screen illustrated in FIG. 4C. The print plug-in server 600 notifies the additional function management unit 304 of the web meeting service of the URL notified by the cloud print service 500. The additional function management unit 304 accesses the notified URL, so that the authentication screen is displayed.

A field 610 for entering the account information (ID and password) for the cloud print service 500 that is a connection destination is displayed on the authentication screen illustrated in FIG. 4C. A screen for selecting the cloud print service 500 to be used can be displayed before FIG. 4C is displayed. The print plug-in server 600 transmits an authentication request to the selected cloud print service 500, so that the screen illustrated in FIG. 4C is displayed. A plurality of cloud print services 500 can be displayed as connection destination information, and the user can select a cloud print service 500 for use. In this case, the print plug-in server 600 stores access destination information such as URLs of the cloud print services 500 and transmits an authentication request to an access destination associated with the selected cloud print service 500.

In step S1302, the additional function management unit 304 receives entry of the user ID and the password.

In step S1303, the additional function management unit 304 detects a selection of an allow button 611 after the entry of the items is completed.

In step S1304, the additional function management unit 304 transmits the entered information and the authentication request to the cloud print service 500. The cloud print service 500 performs authentication processing based on the received content and receives an authentication result. In a case where the authentication is successful, the cloud print service 500 notifies the print plug-in server 600 of an access token. The print plug-in server 600 stores the user ID of the web meeting system 300 and the access token acquired from the cloud print service 500 in association with each other. Thereafter, the print plug-in server 600 accesses the cloud print service 500 using the access token associated with the user using the web meeting system 300.

Figure 9C:
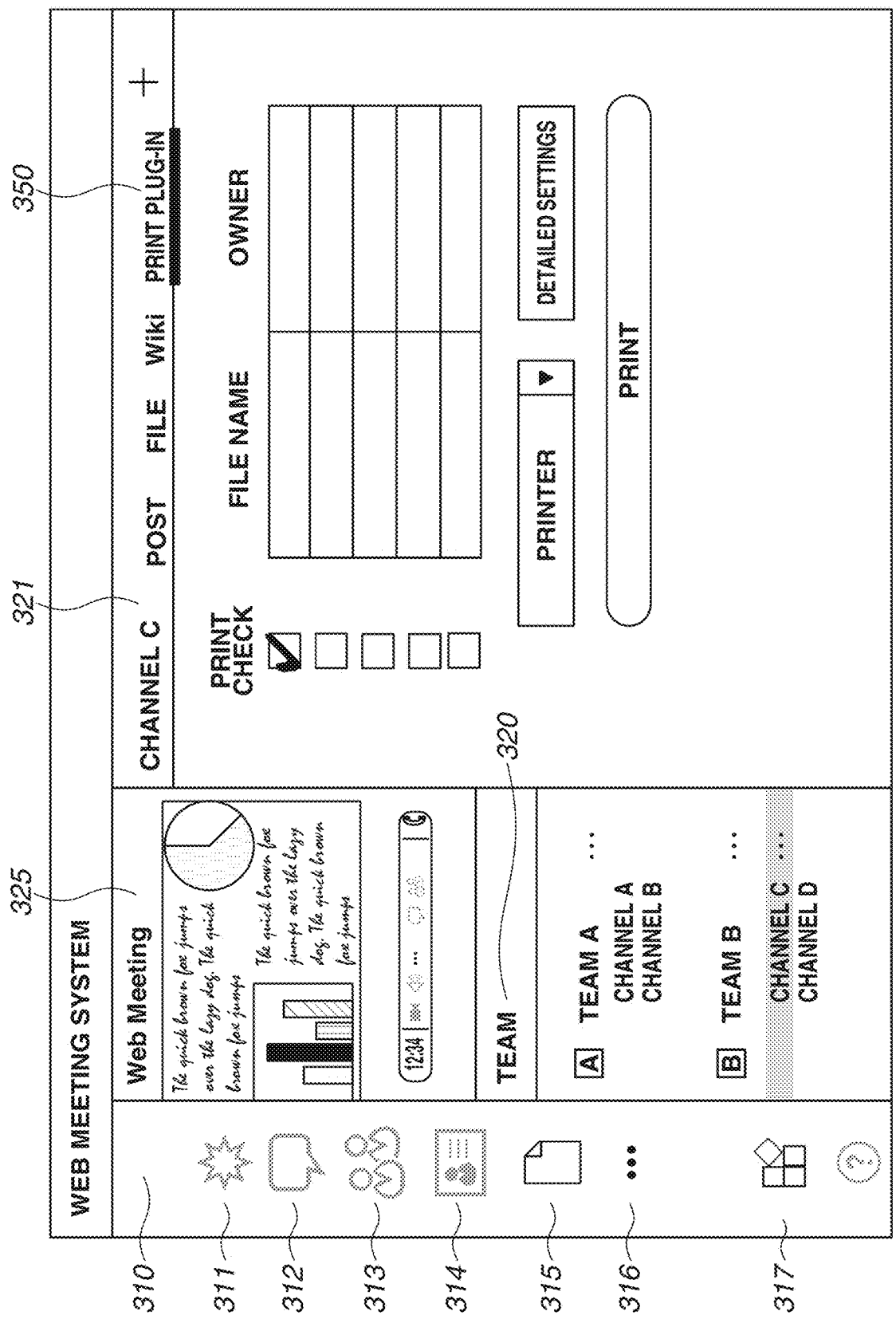
FIG. 9C is a diagram illustrating an example of a screen displayed in a case where printing is performed using a tab screen from a screen during a meeting according to an exemplary embodiment of the present disclosure.
Figure 9D:
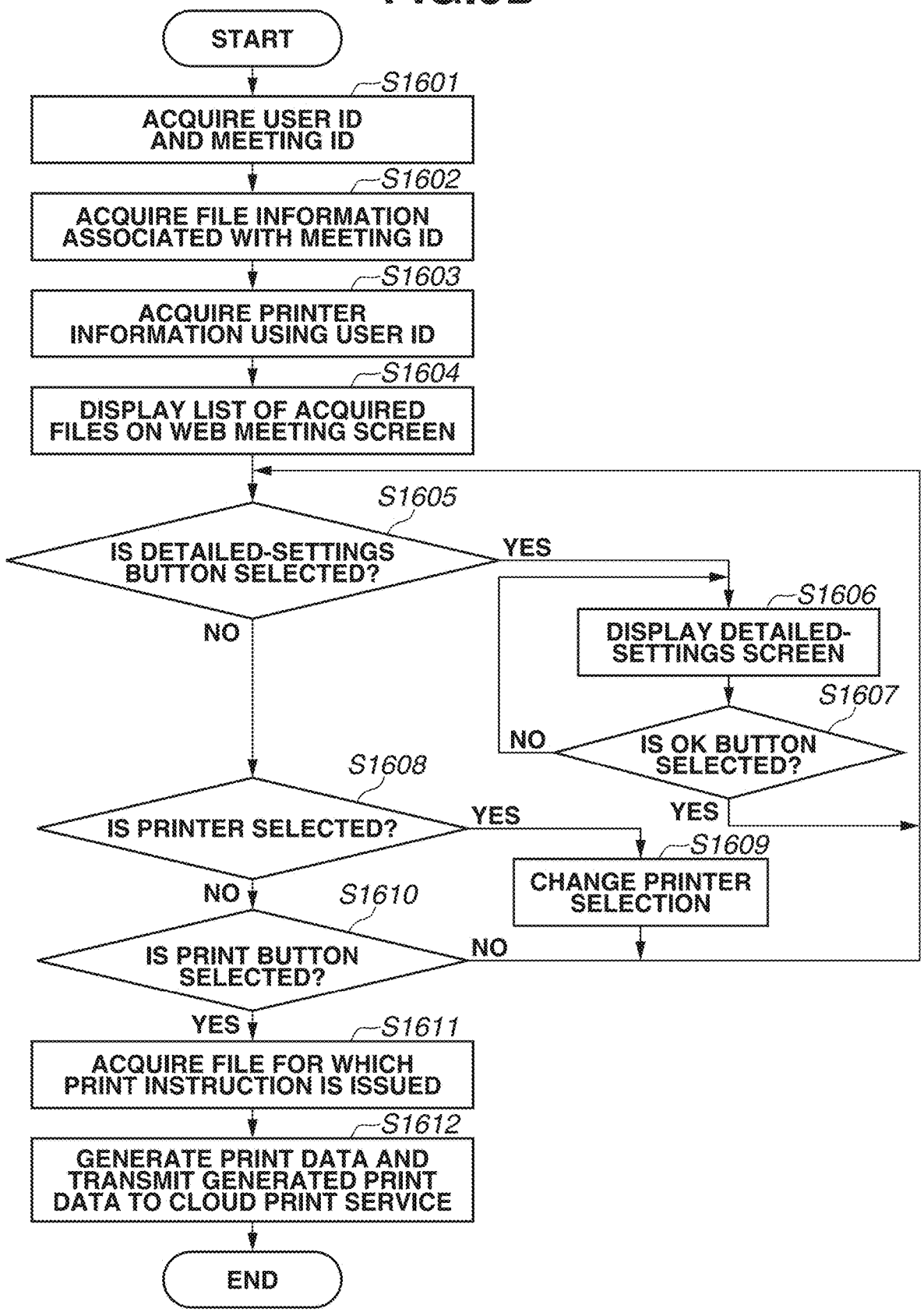
FIG. 9D is a flowchart illustrating an example of a process that is performed by a print plug-in server according to a first exemplary embodiment.

The process is performed when the print button is selected for the first time after the print plug-in is installed. Second or subsequent access to the cloud print service 500 is performed using the acquired access token, so that the process illustrated in FIG. 5C is not performed and the process illustrated in FIG. 9D is performed. However, in a case where authentication using the access token stored in the print plug-in service fails, the print plug-in server 600 performs the process illustrated in FIG. 5C again.

Further, the process illustrated in FIG. 5C is performed at the selection of the print button. The process illustrated in FIG. 5C may be performed at the completion of installation of the print plug-in.

Next, a process after an authentication to the cloud print service 500 is completed will be described.

FIG. 9D is a flowchart illustrating a process that is performed after an authentication to the cloud print service 500 is completed. The process illustrated in FIG. 9D is implemented by operation of the modules of the print plug-in server 600.

In step S1601, the UI generation/operation reception unit 603 acquires the user ID of the user having selected the print button from the additional function management unit 304 of the web meeting system 300 and the meeting ID of the meeting that the user is attending.

In step S1602, the file operation unit 601 acquires the file information associated with the meeting ID acquired in step S1601 from the web meeting system 300. The file information is, for example, the name of the file and the name of the user having uploaded the file. Information other than those described above, such as the upload date/time of the file and the number of pages, may be acquired. The web meeting system 300 refers to the table illustrated in FIG. 11 based on a request from the print plug-in server 600 and identifies a file that is associated with the meeting ID and is allowed to be printed. Then, the web meeting system 300 transmits information about the identified file to the print plug-in server 600. In step S1602, information about the file associated with the meeting ID may be transmitted to the print plug-in server 600 without referring to the right of the file. In this case, after a print instruction is issued, whether printing of the file is allowed is determined at the time of acquiring the file from the web meeting system 300 or the cloud storage service 400 by the file operation unit 601. In a case where printing of the file is allowed, the file operation unit 601 transmits the acquired data to the data input unit 602 and continues processing to execute printing. In a case where printing of the file is not allowed, the file operation unit 601 provides an error notification and performs control to not perform printing.

Next, in step S1603, the cloud print service cooperation management unit 604 accesses the cloud print service 500 and acquires printer information that the user of the user ID acquired in step S1601 is allowed to use. In step S1603, the cloud print service cooperation management unit 604 accesses the cloud print service 500 using the authentication token associated with the user ID acquired in step S1601. Then, the printer information registered in the cloud print service 500 in association with the user authenticated using the authentication token is acquired. The printer information notified to the cloud print service cooperation management unit 604 in step S1603 is the printer information associated with the authenticated user or the printer information shared for use by the tenant or team to which the user belongs.

In step S1604, the UI generation/operation reception unit 603 generates a print file selection screen using the file information acquired from the web meeting system 300 and displays the generated print file selection screen on the web meeting system 300. In this way, a screen displayed in a field 329 in FIG. 9B is displayed. The field 329 is a screen that is displayed by the print plug-in, and displays a list 331 of files selectable as a file to be printed. The user can select a print file by selecting a checkbox 330. A field 332 is a field for selecting a printer as a print data output destination. The field 332 displays the printer information acquired from the cloud print service 500 in step S1603. A button 333 is a button for setting detailed print settings. A button 334 is a button for issuing a print instruction. In displaying the printer information in step S1604, only the printer information about a printer near the current location of the user may be displayed using user location information.

In the present exemplary embodiment, the field 329 displays a list of files stored in association with the meeting ID. The files may be filtered to display only a file that is uploaded in response to a meeting information guide.

Further, each file that is not allowed to be printed among the files displayed in the field 329 may be grayed out to be unselectable.

In step S1605, the UI generation/operation reception unit 603 determines whether the button 333 is selected. In a case where the UI generation/operation reception unit 603 determines that the button 333 is selected (YES in step S1605), the processing proceeds to step S1606. On the other hand, in a case where the UI generation/operation reception unit 603 determines that the button 333 is not selected (NO in step S1605), the processing proceeds to step S1608.

Figure 8B:
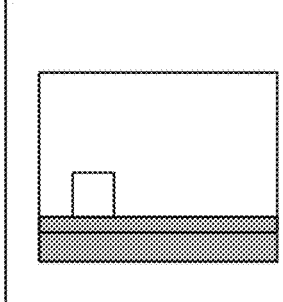
FIG. 8B is a diagram illustrating an example of a print detailed-settings screen provided by a print plug-in according to an exemplary embodiment of the present disclosure.

In step S1606, the UI generation/operation reception unit 603 displays the print detailed-settings screen illustrated in FIG. 8B. The layout settings such as a document size setting and an aggregation setting, two-sided printing setting, and staple setting can be set on the print detailed-settings screen. The print detailed-settings screen may display only common detailed-setting items of the cloud print service 500 to allow the user to select. Further, the cloud print service 500 may communicate with each printer to acquire capability information about the printer and may transmit the acquired capability information to the UI generation/operation reception unit 603, so that detailed settings to which the capability information about the printer is applied may be generated and displayed.

While the print settings are set using the print detailed-settings screen in the present exemplary embodiment, some of the setting items that are settable on the print detailed-settings screen may be set settable in the field 329.

In step S1607, the UI generation/operation reception unit 603 determines whether a button 335 on the print detailed-settings screen illustrated in FIG. 8B is selected. In a case where the button 335 is selected (YES in step S1607), the data input unit 602 stores the information set on the print detailed-settings screen and hides the print detailed-settings screen. Consequently, the screen illustrated in FIG. 9B is displayed. Then, the processing returns to step S1605.

Next, in step S1608, the UI generation/operation reception unit 603 determines whether the field 332 is selected. In a case where the field 332 is selected (YES in step S1608), the UI generation/operation reception unit 603 displays a list of printers that can be used in printing based on the printer information acquired in step S1603. The user can select a printer for use in printing from the list of printers.

In step S1609, The UI generation/operation reception unit 603 receives a printer selection from the user and changes the name of the printer displayed in the field 332. Thereafter, the processing returns to step S1605.

In step S1610, the UI generation/operation reception unit 603 determines whether a selection of the button 334 is received from the user. In a case where the button 334 is not selected (NO in step S1610), the processing returns to step S1605. On the other hand, in a case where the button 334 is selected (YES in step S1610), the processing proceeds to step S1611.

In step S1611, the file operation unit 601 accesses the cloud storage service 400 or the web meeting system 300, and acquires a file for which the print instruction is issued. In a case where the file for which the print instruction is issued is a file stored in the cloud storage service 400, the file operation unit 601 acquires the file from the cloud storage service 400. On the other hand, in a case where the file for which the print instruction is issued is a file uploaded to the web meeting system 300, the file operation unit 601 acquires the file from the web meeting system 300. In a case where the file acquisition fails in step S1611, the file operation unit 601 receives an error notification from the cloud storage service 400. The UI generation/operation reception unit 603 displays an error notification screen on the web meeting screen.

In the present exemplary embodiment, a file uploaded to the web meeting system 300 is stored in the storage of the web meeting system 300. Alternatively, in a case where a file is uploaded to the web meeting system 300, the file management unit 303 may transmit the file to the cloud storage service 400 to store the file in the cloud storage service 400. In this case, the file operation unit 601 of the print plug-in server 600 does not access the web meeting system 300 but accesses the cloud storage service 400, and acquires the file for which the print instruction is issued.

In step S1612, the data input unit 602 generates print data based on the file acquired from the web meeting system 300 or the cloud storage service 400 and the print settings stored in step S1607, and transmits the generated print data to the cloud print service 500.

Then, the print plug-in server 600 ends the processing. In the above-described exemplary embodiment, the print plug-in server 600 displays the field 329 illustrated in FIG. 9B. Alternatively, in a case where the icon 327 or 328 is selected, the print plug-in screen illustrated in FIG. 8A may be displayed as a modal dialog or a pop-up window. The screen illustrated in FIG. 8A has a configuration similar to that of the field 329 in FIG. 9B, so that redundant descriptions thereof are omitted. Further, whether to display the screen illustrated in FIG. 8A or display the screen illustrated in FIG. 9B may be selected based on the icon selected by the user. For example, the screen illustrated in FIG. 8A may be displayed in a case where the icon 328 is selected by the user, whereas the screen illustrated in FIG. 9B may be displayed in a case where the icon 327 is selected.

Figure 12:
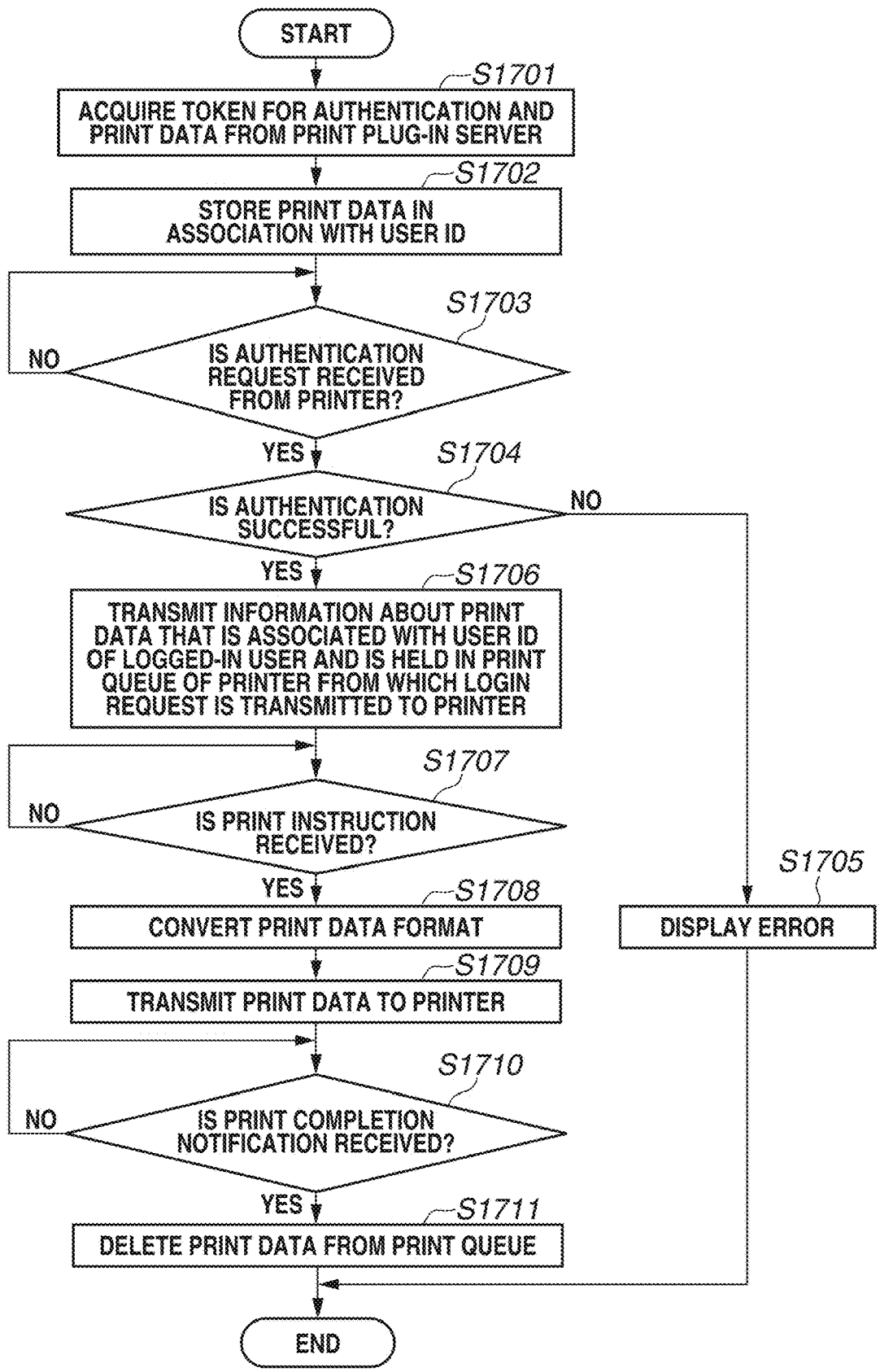
FIG. 12 is a flowchart illustrating a process for printing by a cloud print service according to an exemplary embodiment of the present disclosure.

A process from the holding of print data in the cloud print service 500 to the printing of the held print data will be described with reference to FIG. 12. The process illustrated in FIG. 12 is implemented by the modules of the cloud print service 500 by performing processing.

The cloud print service 500 having received print data from the print plug-in server 600 stores the print data in association with user account information. The user logs into the cloud print service 500 using an operation unit of the printer 201. The following process starts at the reception of print data from the print plug-in server 600 by the cloud print service 500.

In step S1701, the job management unit 505 receives the print data generated in step S1612 and a token for user authentication from the print plug-in server 600.

In step S1702, the job management unit 505 stores the print data in association with the user ID identified by the token for authentication.

Next, in step S1703, the print account management unit 501 determines whether an authentication request is received from the printer 201. The print account management unit 501 receives the user ID and the password or receives the authentication token from the printer 201, and performs user authentication.

In step S1704, the print account management unit 501 determines whether the authentication is successful. In a case where the authentication is unsuccessful (NO in step S1704), the processing proceeds to S1705. In step S1705, the print account management unit 501 notifies the printer 201 of the error. The printer 201 displays the occurrence of the error on a display unit.

On the other hand, in a case where the authentication is successful (YES in step S1704), the processing proceeds to step S1706. In step S1706, the job management unit 505 transmits to the printer 201 information about the print data that is associated with the user ID of the authenticated user and is held in the print queue of the printer from which the authentication request is transmitted. The information transmitted to the printer 201 is information about the file name of the print data and the date and time of the input of the print data input to the cloud print service 500. The printer 201 displays a list of printable files on the display unit based on the information acquired from the cloud print service 500, and receives a selection of a file to be printed from the user.

In step S1707, the job management unit 505 determines whether a print instruction is received from the printer 201. In a case where a print instruction is not received (NO in step S1707), the job management unit 505 continues the processing in step S1707. On the other hand, in a case where a print instruction is received (YES in step S1707), the processing proceeds to step S1708. In step S1708, the graphic filter 504 and the configuration filter 503 convert the print data into a format that is interpretable by the transmission destination printer. Then, in step S1709, the job management unit 505 transmits the print data to the printer 201. In step S1710, the job management unit 505 determines whether a print completion notification is received from the printer 201. In a case where a print completion notification is not received (NO in step S1710), the job management unit 505 continues the processing of step S1710. On the other hand, in a case where a print completion notification is received (YES in step S1710), the processing proceeds to step S1711. In step S1711, the job management unit 505 deletes the print data held at the cloud print service 500. Then, the process of printing the print data held in the cloud print service 500 ends.

A system of issuing a print instruction from a screen tab illustrated in FIG. 4B is another possible method of printing during the meeting in the web meeting system 300. In a case where the icon 313 is selected on the screen in FIG. 9A during the meeting, the shared screen 325 is reduced and the team/channel selection screen 320 and the tab field 321 are displayed as illustrated in FIG. 9C. In a case where the print plug-in is installed, a "print plug-in" 350 is added to a tab section. In a case where the user selects the "print plug-in" 350, a print plug-in screen as illustrated in FIG. 9C is displayed. The field 329 in FIG. 8A that is generated in step S1401 is displayed on the print plug-in screen. A print order is also the same, and printing is performed in the order of steps S1402 to S1405.

As described above, the print plug-in service is installed in the web meeting system 300, so that the user can print a file for use in a web meeting that the user is attending from the web meeting screen.

In the first exemplary embodiment, printing from the web meeting screen is described. In a second exemplary embodiment, a case where a file for use in a meeting is uploaded through the channel screen illustrated in FIG. 4B and the file is printed through the channel screen will be described. This enables printing of a file associated with the web meeting before or after the meeting when the web meeting is not being held.

Figure 13:
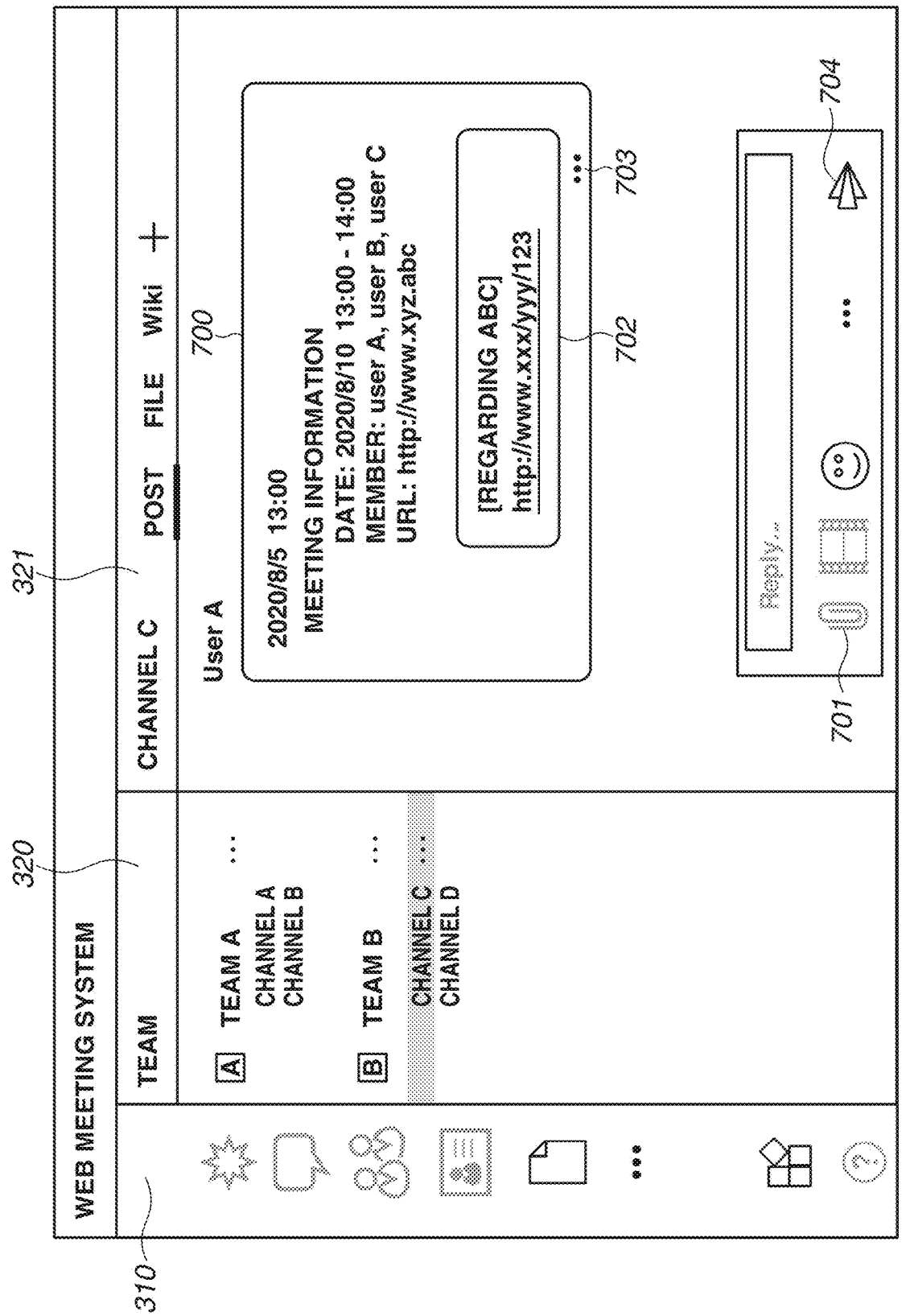
FIG. 13 is a diagram illustrating an example of a screen displayed by a web meeting system according to a second exemplary embodiment.

In the web meeting system 300, in a case where User A sets a meeting schedule, a meeting notice 700 in FIG. 13 is displayed in a "post" tab of the channel screen. A user being a member of the channel can upload a file for use in the meeting to the web meeting system 300 by selecting the meeting notice 700 and then selecting an icon 701.

In a case where the user selects the icon 701, a screen for selecting a file to be uploaded from a client computer or the cloud storage service 400 is displayed. In a case where the user selects a file to be printed and selects an icon 704, information about the uploaded file is displayed as in a field 702. The field 702 displays a name of the file and a link for accessing the file.

In a case where the user selects an icon 703, an operation that can be performed on the uploaded file is displayed. At this time, in a case where the print plug-in is installed, "printing" is displayed as an operation for the file. In a case where the user selects the "printing", the additional function management unit 304 transmits a notification to the print plug-in server 600, and the screen illustrated in FIG. 8A is displayed.

The subsequent processing is similar to that in the first exemplary embodiment, so that redundant descriptions thereof are omitted. As described above, a file associated with a web meeting can be referred to even when the web meeting is not being held, so that a document for use in a web meeting can be printed even when the web meeting is not being held.

While the cloud print service 500 is used in the first exemplary embodiment, there may be a case where the user locally prints using a print driver installed in the client computer 100 or 203. A third exemplary embodiment is directed to a technique by which a user can use either one of a printer registered in the cloud print service 500 and a printer having a local print queue in the client computer 100 or 203 in printing using a print plug-in.

In the third exemplary embodiment, in a case where an instruction to print a file is issued, a print plug-in screen illustrated in FIG. 10A is displayed. At this time, the field 332 displays a "local printer" in addition to the printer registered in the cloud print service 500. The "local printer" button is a button for downloading a file, opening the file downloaded by the user, and printing the file.

Figure 10B:
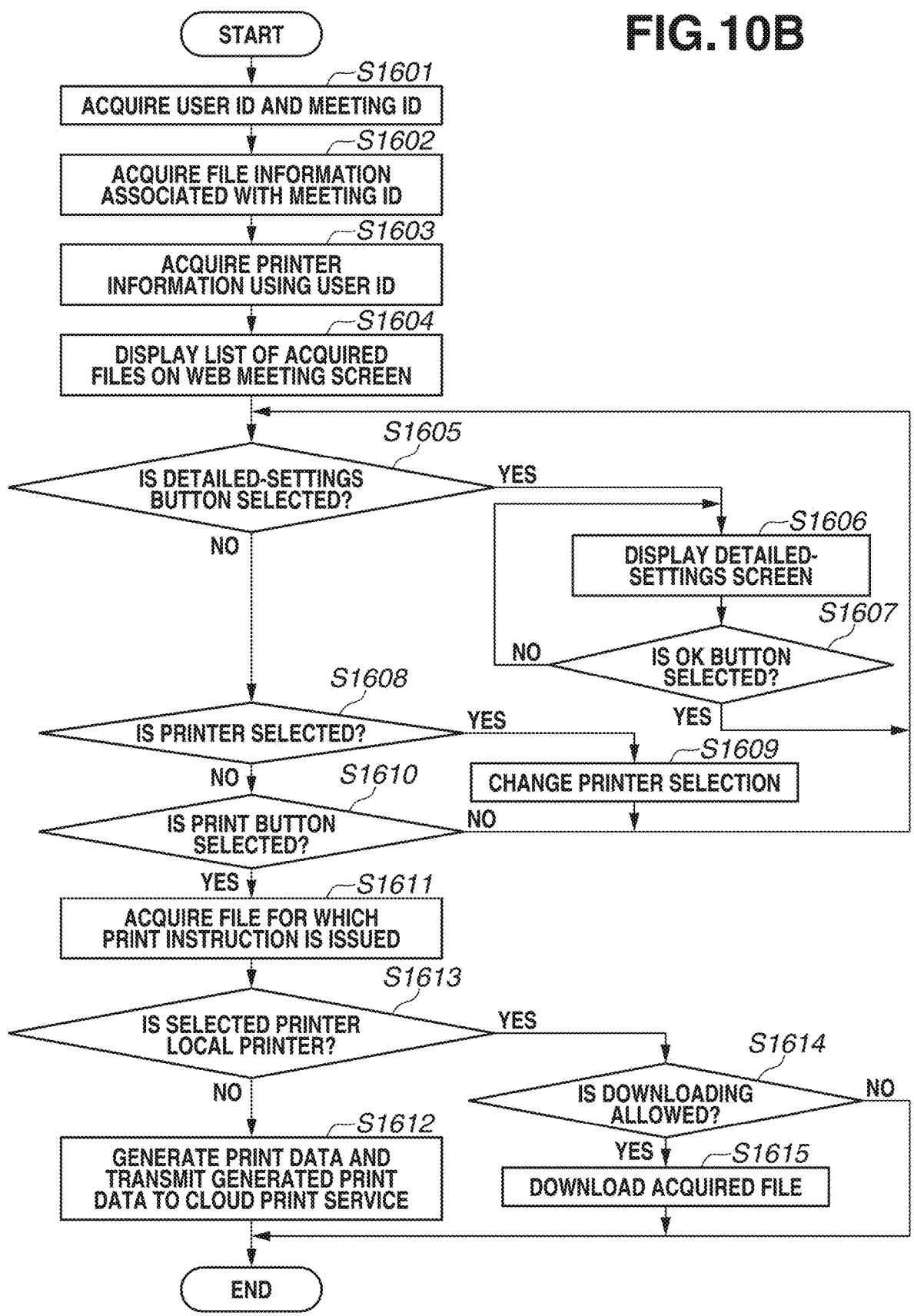
FIG. 10B is a flowchart illustrating an example of a process that is performed by a print plug-in server according to the third exemplary embodiment.

FIG. 10B is a flowchart illustrating a process of the print plug-in server 600 according to the third exemplary embodiment. The processing illustrated in FIG. 10B is performed by the modules of the print plug-in server 600. Redundant descriptions of points that are similar to those in the first exemplary embodiment are omitted.

In step S1604, the UI generation/operation reception unit 603 displays a list containing the printer information acquired from the cloud print service 500 and the "local printer".

In step S1613, the file operation unit 601 determines whether the file output destination is the "local printer". In a case where the selected printer is not the local printer (NO in step S1613), the processing proceeds to step S1612. On the other hand, in a case where the file operation unit 601 determines that the selected printer is the "local printer" (YES in step S1613), the processing proceeds to step S1614. In step S1614, the data input unit 602 refers to the rights of the acquired file and determines whether downloading is allowed. In a case where downloading is allowed (YES in step S1614), the processing proceeds to step S1615. In step S1615, the data input unit 602 downloads the file to the client computer 100 or 203. On the other hand, in a case where the selected file is not a file for which downloading is allowed (NO in step S1614), the data input unit 602 issues an error notification, and the process illustrated in FIG. 10B ends.

By the foregoing operations, a file to be printed using a print queue of a client computer used by a user is downloaded with ease.

With the system described in the present application, an instruction to print a file shared in the web meeting system 300 is received on the web meeting system 300.

Other Embodiments

In the exemplary embodiments described above, the print-plugin is always enabled after the installation. However, the user may be able to set the installed plug-in to be enabled or disabled not depending on the installation. In a case where the print-plugin is set enabled, the icons 327 and 328 are displayed on the web meeting screen and the user can use the print plug-in server 600. On the other hand, in a case where the print-plugin is set disabled, the icons 327 and 328 are not displayed on the web meeting screen and the user cannot use the print plug-in server 600.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-141121, filed Aug. 24, 2020, which is hereby incorporated by reference herein in its entirety.

What is claimed is:

1. A server system comprising:
    one or more processors; and
    a memory storing instructions which, when executed by the one or more processors, cause the server system to:
    issue a meeting identification (meeting ID) for identifying a web meeting held by a web meeting service;
    store the issued meeting ID and a file in association with each other;
    receive an instruction to display an image of the file from a first information processing apparatus operated by a first user and cause a display of a second information processing apparatus operated by a second user to display the image of the file for which the display instruction is received;
    install, based on an instruction by the second user, a print plug-in association with the second user on the server system; and
    by installing the print plug-in, cause the display to display on a web meeting screen provided by the web meeting service, an object to receive, from the second user, an instruction to print the file associated with the meeting ID associated with the second user.

2. The server system according to claim 1,
    wherein the meeting ID and a plurality of files are stored in association with each other, and
    wherein a screen for receiving selection of the file from the plurality of files by the second user is displayed by an operation of the displayed object.

3. The server system according to claim 2, wherein the one or more processors cause the server system to:
    receive selection of the file to be printed from the plurality of files by the second user; and
    transmit the selected file to a cloud print service,
    wherein the cloud print service transmits the file to a printer associated with the cloud print service.

4. The server system according to claim 1,
    wherein, in a case where the print plug-in is not installed in association with the second user, the object to receive the instruction to print the file from the second user is not displayed on the web meeting screen.

5. The server system according to claim 1,
    wherein
    the meeting ID associated with the second user is a meeting ID of an online meeting in which the second user participates.

6. A method to be executed by a server system, the method comprising:
    issuing a meeting identification (meeting ID) for identifying a web meeting held by a web meeting service;
    storing the issued meeting ID and a file in association with each other;
    receiving an instruction to display an image of the file from a first information processing apparatus operated by a first user and causing a display of a second information processing apparatus operated by a second user to display the image of the file for which the display instruction is received;
    installing, based on an instruction by the second user, a print plug-in in association with the second user on the server system; and
    by installing the print plug-in, causing the display to display on a web meeting screen provided by the web meeting service, an object to receive, from the second user, an instruction to print the file associated with the meeting ID associated with the second user.

7. A non-transitory computer-readable storage medium storing a computer program that, when executed by a server system, causes the server system to perform the method according to claim 6.

* * * * *